(12) United States Patent
Kimura

(10) Patent No.: US 9,449,376 B2
(45) Date of Patent: Sep. 20, 2016

(54) IMAGE PROCESSING APPARATUS AND IMAGE PROCESSING METHOD FOR PERFORMING TONE CORRECTION OF AN OUTPUT IMAGE

(71) Applicant: CANON KABUSHIKI KAISHA, Tokyo (JP)

(72) Inventor: Naoto Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 14/170,929

(22) Filed: Feb. 3, 2014

(65) Prior Publication Data

US 2014/0226903 A1 Aug. 14, 2014

(30) Foreign Application Priority Data

Feb. 8, 2013 (JP) .................................. 2013-023825

(51) Int. Cl.
| | | |
|---|---|---|
| *G06K 9/34* | (2006.01) | |
| *G06T 5/40* | (2006.01) | |
| *G06T 5/00* | (2006.01) | |
| *H04N 1/60* | (2006.01) | |

(52) U.S. Cl.
CPC ................. *G06T 5/40* (2013.01); *G06T 5/008* (2013.01); *H04N 1/6027* (2013.01); *G06T 2207/10024* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 6,282,317 | B1 * | 8/2001 | Luo ..................... | G06K 9/00234 382/203 |
| 6,583,820 | B1 * | 6/2003 | Hung ............................ | 348/362 |
| 6,636,646 | B1 * | 10/2003 | Gindele ........................ | 382/274 |
| 6,667,765 | B1 * | 12/2003 | Tanaka ........................ | 348/229.1 |
| 7,057,650 | B1 * | 6/2006 | Sakamoto ..................... | 348/239 |
| 2007/0177050 | A1 * | 8/2007 | Xiao et al. .................... | 348/371 |
| 2008/0187235 | A1 * | 8/2008 | Wakazono et al. ........... | 382/255 |
| 2009/0073287 | A1 * | 3/2009 | Shimizu ........................ | 348/234 |
| 2012/0314971 | A1 * | 12/2012 | Yuan et al. .................... | 382/274 |

FOREIGN PATENT DOCUMENTS

JP 2010-130150 A 6/2010

* cited by examiner

*Primary Examiner* — Andrae S Allison
(74) *Attorney, Agent, or Firm* — Cowan, Liebowitz & Latman, P.C.

(57) ABSTRACT

An image processing apparatus comprises a region discrimination unit configured to discriminate object regions included in an image; a first calculation unit configured to calculate representative luminance values of a plurality of object regions discriminated by the region discrimination unit; a second calculation unit configured to calculate luminance distribution information of each of the plurality of object regions discriminated by the region discrimination unit; a determination unit configured to determine tone characteristics based on the representative luminance values of the plurality of object regions calculated by the first calculation unit and the pieces of luminance distribution information of the plurality of object regions calculated by the second calculation unit; and an image processing unit configured to perform tone correction processing based on the tone characteristics determined by the determination unit.

17 Claims, 21 Drawing Sheets

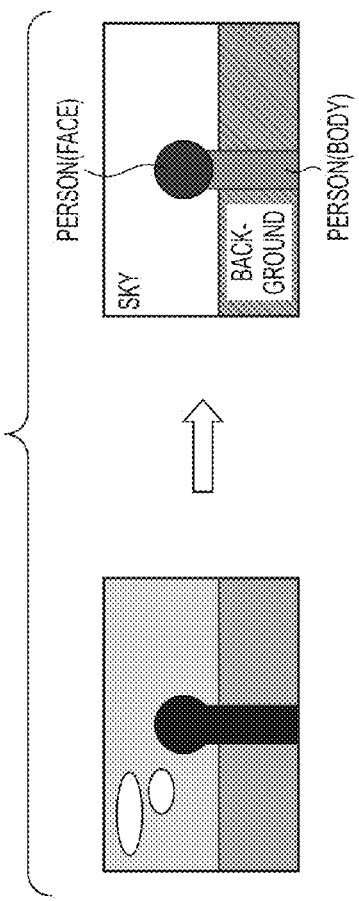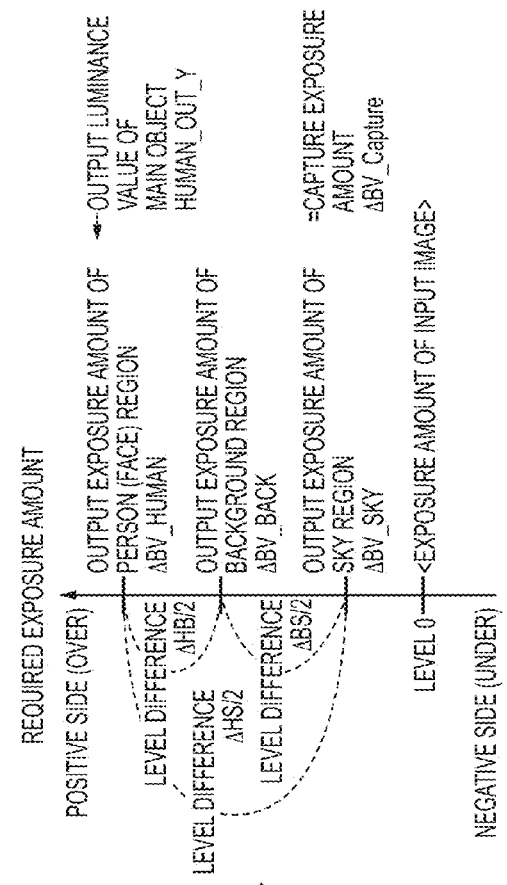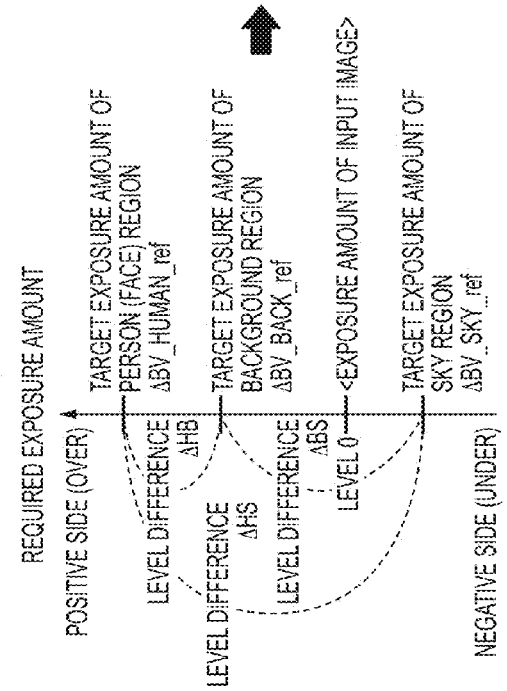

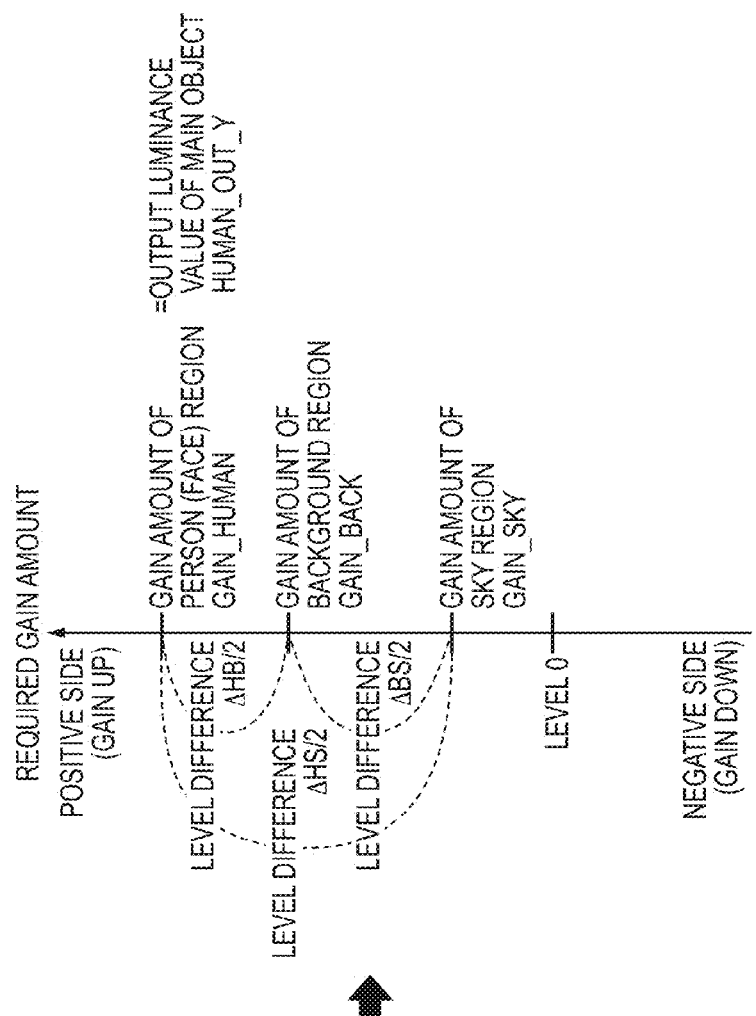
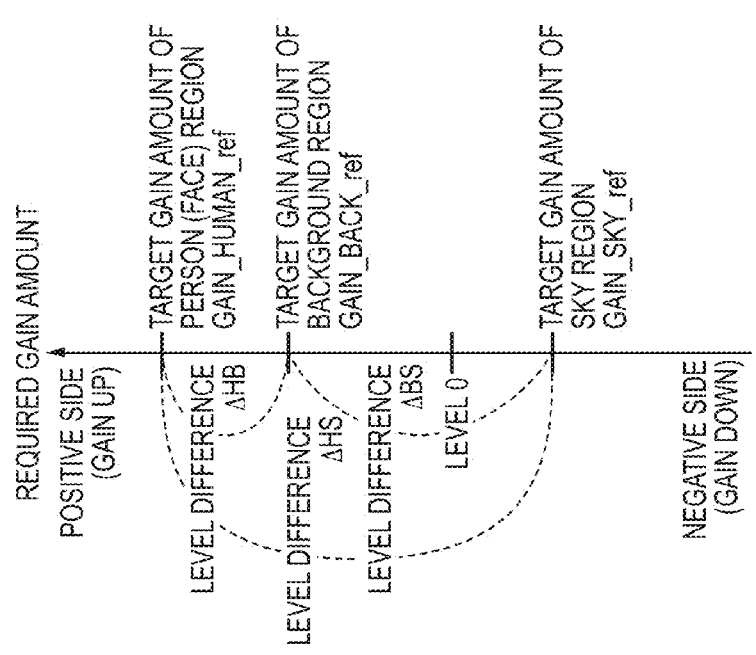
FIG. 10A
FIG. 10B

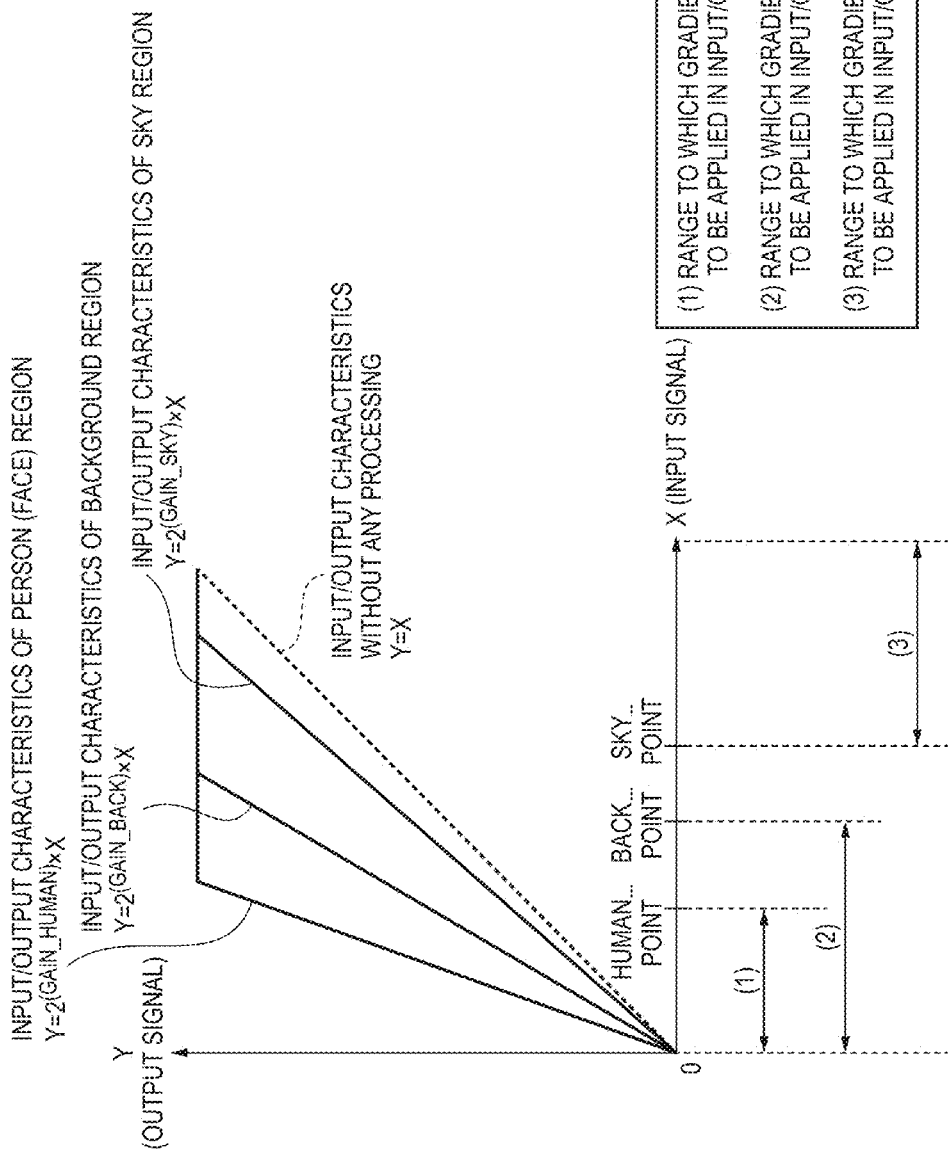

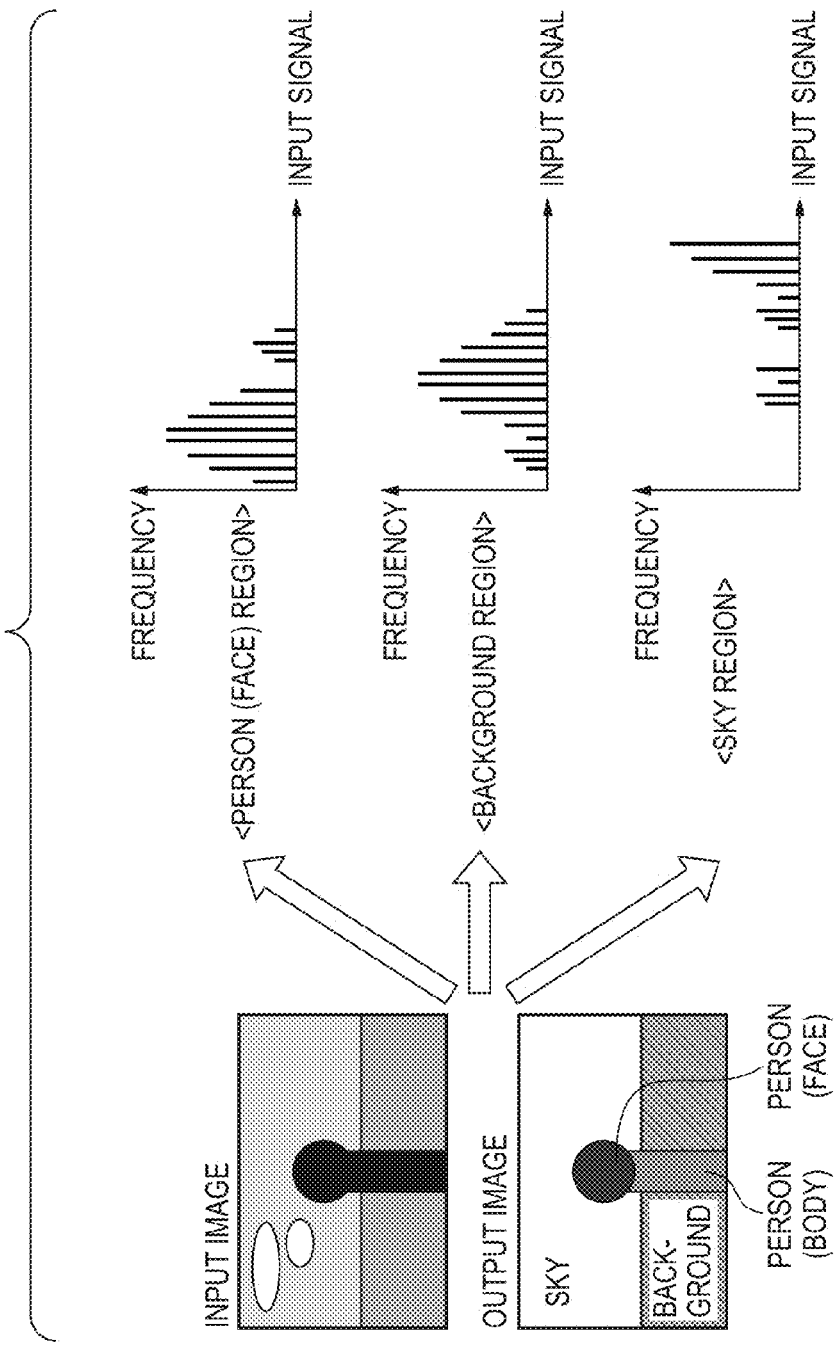

IMAGE PROCESSING APPARATUS AND IMAGE PROCESSING METHOD FOR PERFORMING TONE CORRECTION OF AN OUTPUT IMAGE

BACKGROUND OF THE INVENTION

1. Field of the Invention

The present invention relates to an image processing technique for performing tone correction of an output image.

2. Description of the Related Art

Conventionally, processing such as high dynamic range imaging (HDR) or color dodging, which applies tone compression to an input signal, a dynamic range of which is widen, and outputs the processed signal, is known.

For example, Japanese Patent Laid-Open No. 2010-130150 has proposed a technique for dividing an image into a plurality of areas, calculating histograms for respective areas based on representative pixel values calculated from these areas and edge components, and generating tone conversion curves corresponding to areas based on the calculated histograms.

However, with the technique of Japanese Patent Laid-Open No. 2010-130150, since a balance between object regions is not taken into consideration, an unnatural image is formed as a dynamic range is widened.

SUMMARY OF THE INVENTION

The present invention has been made in consideration of the aforementioned problems, and realizes a technique for generating an image with a wide dynamic range and high contrast.

In order to solve the aforementioned problems, the present invention provides an image processing apparatus comprising: a region discrimination unit configured to discriminate object regions included in an image; a first calculation unit configured to calculate representative luminance values of a plurality of object regions discriminated by the region discrimination unit; a second calculation unit configured to calculate luminance distribution information of each of the plurality of object regions discriminated by the region discrimination unit; a determination unit configured to determine tone characteristics based on the representative luminance values of the plurality of object regions calculated by the first calculation unit and the pieces of luminance distribution information of the plurality of object regions calculated by the second calculation unit; and an image processing unit configured to perform tone correction processing based on the tone characteristics determined by the determination unit.

In order to solve the aforementioned problems, the present invention provides an image processing method comprising: a region discrimination step of discriminating object regions included in an image; a first calculation step of calculating representative luminance values of a plurality of object regions discriminated in the region discrimination step; a second calculation step of calculating luminance distribution information of each of the plurality of object regions discriminated in the region discrimination step; a determination step of determining tone characteristics based on the respective representative luminance values of the plurality of object regions calculated in the first calculation step and the pieces of luminance distribution information of the plurality of object regions calculated in the second calculation step; and an image processing step of performing tone correction processing based on the tone characteristics determined in the determination step.

According to the present invention, an image with a wide dynamic range and high contrast can be generated.

Further features of the present invention will become apparent from the following description of exemplary embodiments (with reference to the attached drawings).

BRIEF DESCRIPTION OF THE DRAWINGS

FIGS. 9A to 9C are views for explaining a determination method of a target exposure amount and exposure amount in addition to luminance level differences between object regions;

FIGS. 10A and 10B are views for explaining a calculation method of luminance level differences between object regions;

FIG. 12 is a graph for explaining input signal ranges in which a tone correction amount is to be applied for respective object regions;

FIGS. 13A and 13B are views for explaining a calculation method of a HUMAN_POINT, BACK_POINT, and SKY_POINT;

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments.

Embodiments in which an image processing apparatus of the present invention is applied to, for example, an image capturing apparatus represented by a digital still camera, digital video camera, or the like will be described hereinafter.

<Apparatus Configuration>

An overview of the configuration and functions of an image capturing apparatus according to an embodiment of the present invention will be described below with reference to FIG. 1.

This embodiment performs optimal tone processing using information of object regions. Note that this embodiment will explain tone processing under an assumption of a person scene at the time of backlight with the highest effects of the present invention, that is a scene in which a person is darkest and sky is brightest. However, it goes without saying that the technical idea of the present invention is applicable to scenes other than the aforementioned scene.

Figure 1:
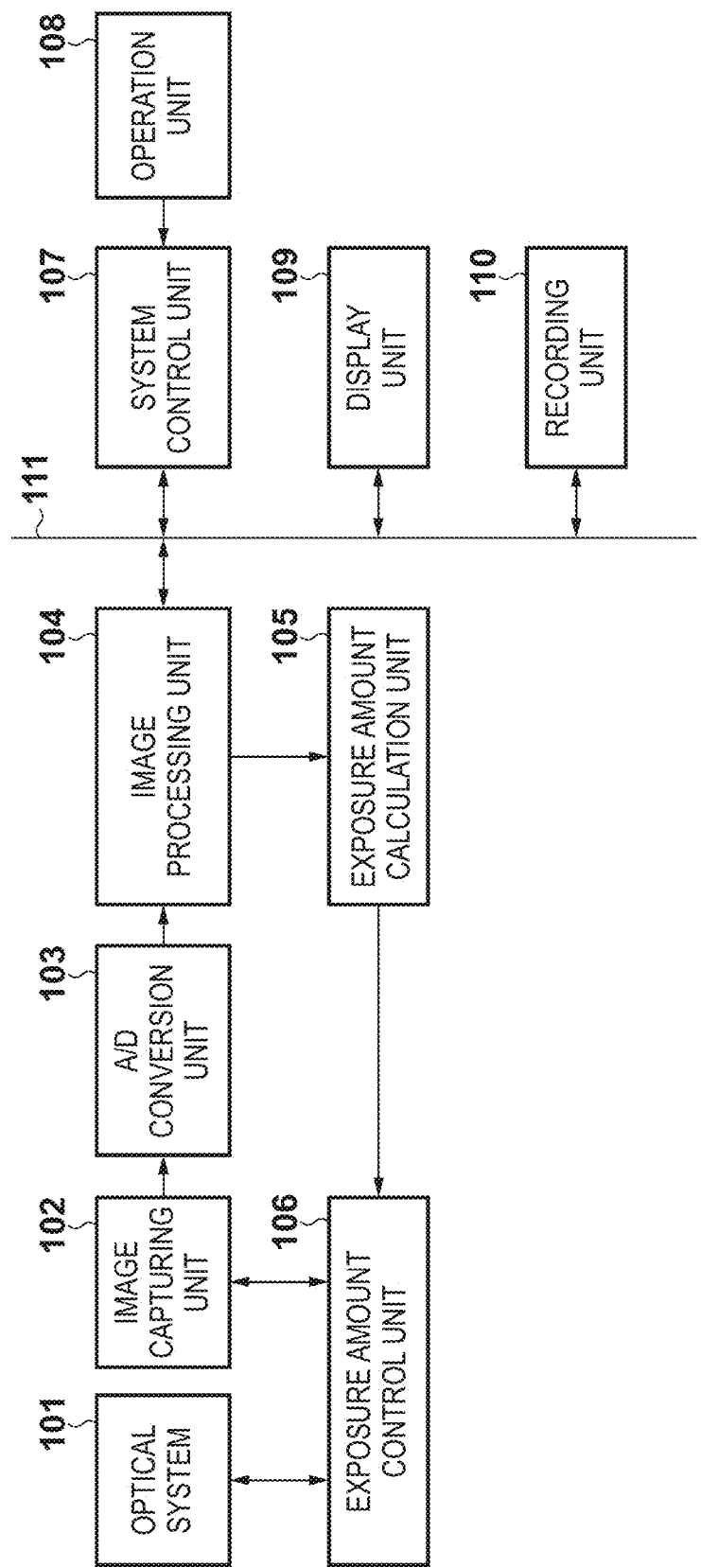
FIG. 1 is a block diagram showing the apparatus configuration according to an embodiment of the present invention.

In FIG. 1, an optical system 101 includes a lens set including a zoom lens and focus lens, aperture adjustment device, and shutter device. This optical system 101 adjusts a magnification, focus position, or incident light amount of an object image formed on an image capturing unit 102. The image capturing unit 102 includes an image sensor including a photoelectric conversion element such as a CCD or CMOS, which photoelectrically converts a light beam of an object that has passed through the optical system 101.

An A/D conversion unit 103 converts a video signal input from the image capturing unit 102 into a digital image.

An image processing unit 104 performs tone processing (to be described later) in addition to normal signal processing. The image processing unit 104 can perform the same image processing not only for a digital image signal output from the A/D conversion unit 103 but also for image data read out from a recording unit 110.

An exposure amount calculation unit 105 calculates an exposure amount at the time of shooting so as to obtain an optimal input image for performing tone processing of this embodiment. The exposure amount calculation unit 105 receives the processing result of the image processing unit 104, and outputs the calculated exposure amount to an exposure amount control unit 106. Details of the exposure amount calculation unit 105 will be described later.

The exposure amount control unit 106 controls the optical system 101 and image capturing unit 102 according to the exposure amount calculated by the exposure amount calculation unit 105, thereby controlling an aperture, shutter speed, and analog gain of the image capturing unit 102.

A system control unit 107 systematically controls the operation of the overall apparatus of this embodiment. Also, the system control unit 107 performs driving control of the optical system 101 and image capturing unit 102 based on luminance values obtained from an image signal processed by the image processing unit 104 and an instruction signal transmitted from an operation unit 108.

A display unit 109 includes a liquid crystal display or organic EL (Electro Luminescence) display, and displays an image signal generated by the image capturing unit 102 and image data read out from the recording unit 110. The recording unit 110 has a function of recording image data, and may include a memory card incorporating a semiconductor memory, or an information recording medium using a package containing a recording body of rotation such as a magneto-optical disk, or may detachably include this information recording medium.

A bus 111 is a transmission path for transmitting an image signal and control signal between the image processing unit 104, system control unit 107, display unit 109, and recording unit 110.

<Exposure Amount Calculation Unit>

Figure 3:
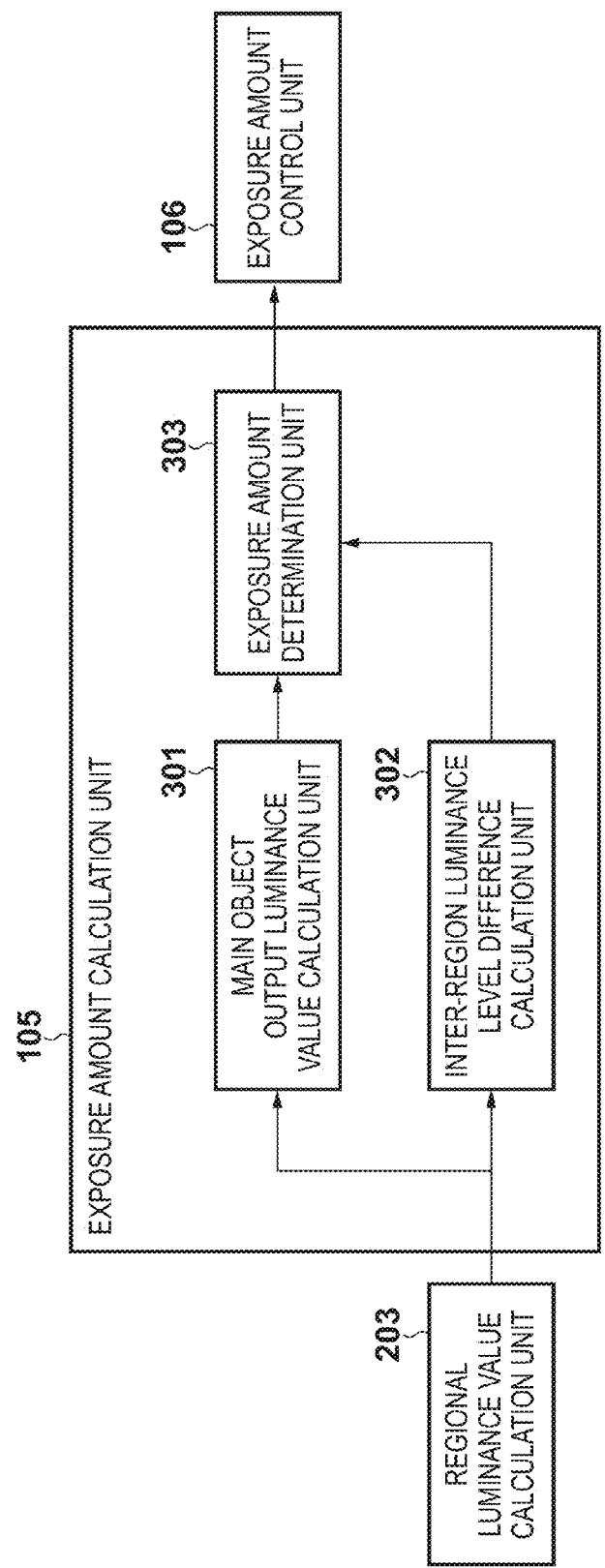
FIG. 3 is a block diagram showing the configuration of an exposure amount calculation unit.

The configuration and functions of the exposure amount calculation unit 105 will be described below with reference to FIG. 3.

The exposure amount calculation unit 105 calculates an exposure amount required to obtain an image signal which is shot to have an optimal exposure amount for performing tone processing. This embodiment also uses information of object regions to calculate an exposure amount.

Figure 2:
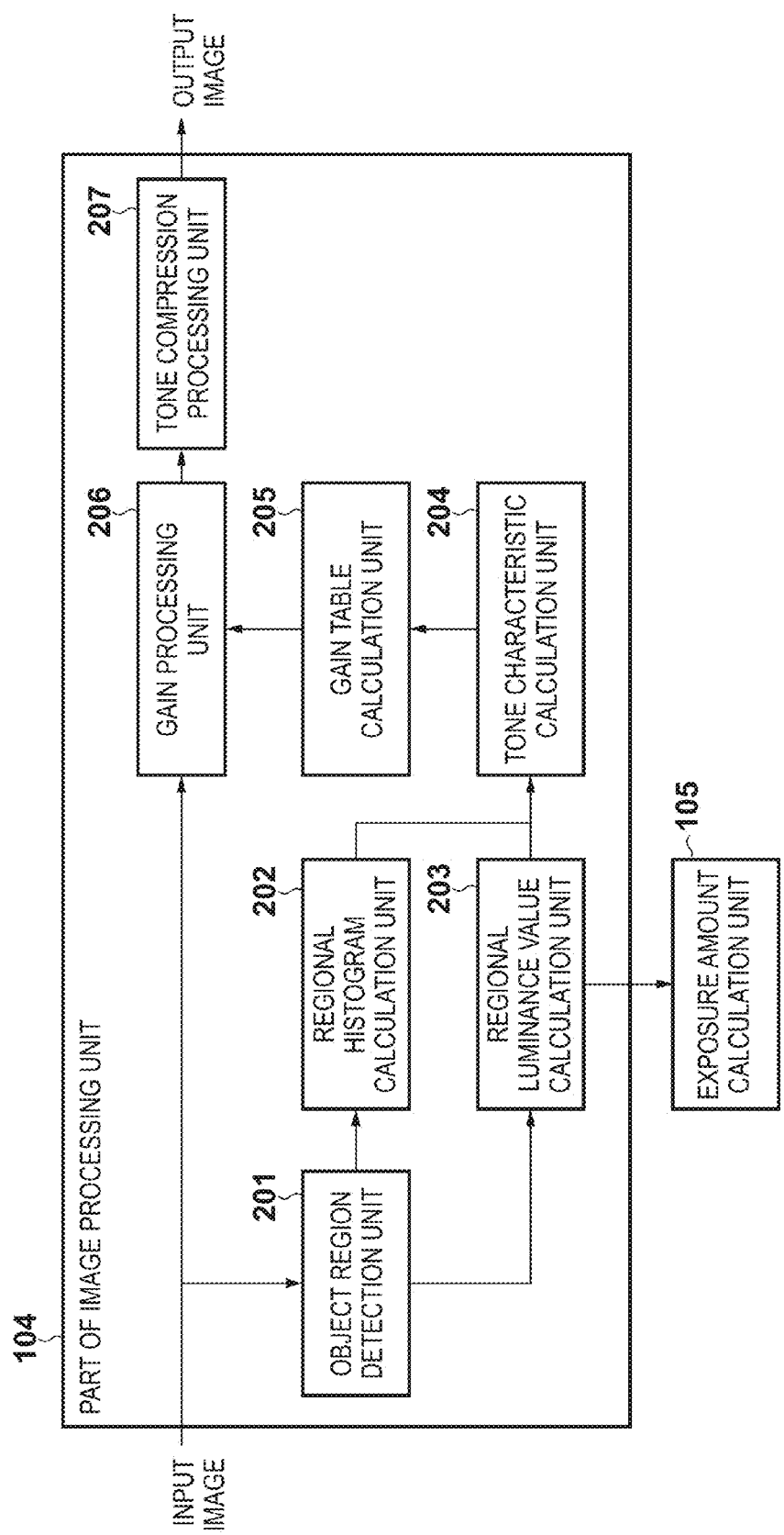
FIG. 2 is a block diagram partially showing the configuration of an image processing unit.

Note that in the following description, an output result of a regional luminance value calculation unit 203 of the image processing unit 104 shown in FIG. 2 is used as input information to the exposure amount calculation unit 105. The configuration and functions of the image processing unit 104 will be described later.

The exposure amount calculation unit 105 receives the output result of the regional luminance value calculation unit 203 to perform processing using an object output luminance value calculation unit 301 and inter-region luminance level difference calculation unit 302, determines an exposure amount using an exposure amount determination unit 303, and then outputs the exposure amount to the exposure amount control unit 106.

Figure 6:
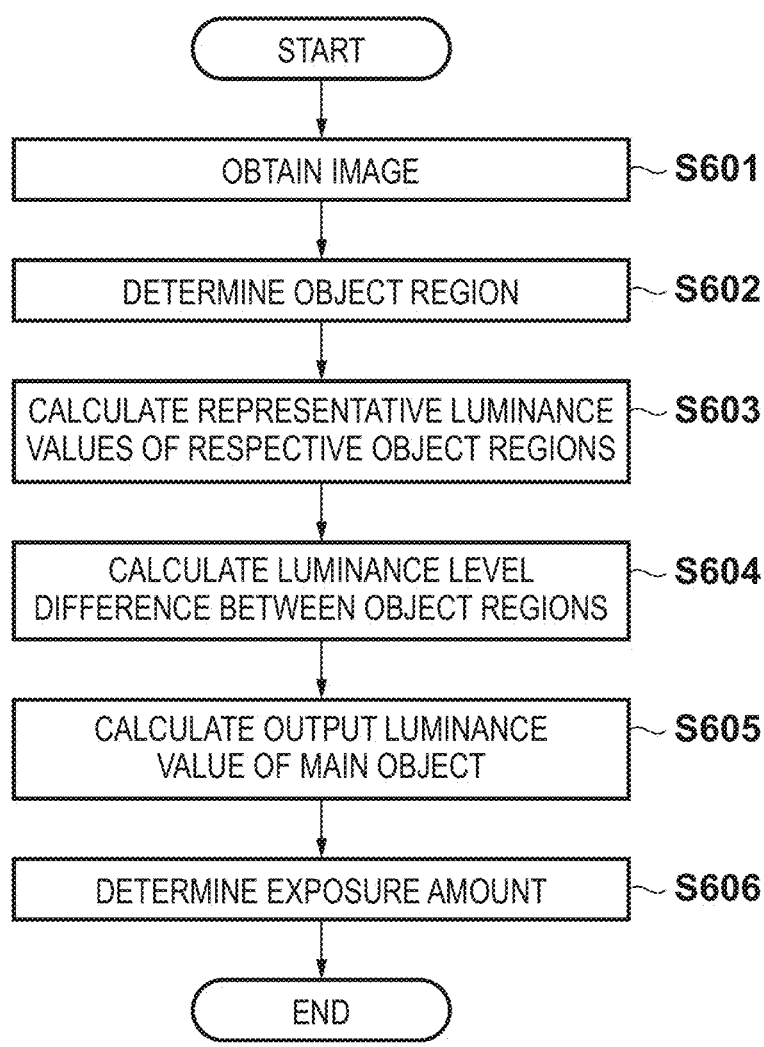
FIG. 6 is a flowchart showing exposure amount calculation processing.

FIG. 6 shows processing executed after an image signal for calculating an exposure amount is obtained until the exposure amount calculation unit 105 calculates an exposure amount. Steps S601 to S603 are performed by the image processing unit 104, and steps S604 to S606 are performed by the exposure amount calculation unit 105. Note that the processing shown in FIG. 6 is implemented when the system control unit 107 expands a program stored in a nonvolatile memory onto a work area of a volatile memory and controls the aforementioned units.

In step S601, the image processing unit 104 obtains an image signal captured by the image capturing unit 102 so as to calculate an exposure amount.

In step S602, the image processing unit 104 determines object regions from the image signal obtained in step S601. This embodiment determines, as object regions, a total of four regions, that is, a face region of a person, a body region other than the face of the person, a sky region including clouds, sun, and the like, a background region other than sky. FIG. 9A shows an example of an object region determination result with respect to an input image. The object region determination method can use a known method such as object recognition using learning data by a neural network (Japanese Patent Laid-Open No. 2006-39666). Also, as for the object region determination method, a method of determining object regions for respective blocks divided to have a given size in place of each pixel may be used.

In step S603, the image processing unit 104 calculates representative luminance values for respective object regions using the object region determination result in step S602. A representative luminance value is an average value of luminance signals in an object region of interest or a weighted average value using weights according to coordinates. Representative luminance values are calculated from three object regions, that is, a person face region, background region, and sky region. Note that a representative luminance value of a person body region is not calculated in this embodiment.

The representative luminance values of the respective object regions will be respectively referred to as "HUMAN_Y", "BACK_Y", and "SKY_Y" hereinafter. In this embodiment, the representative luminance value of each of the person face region and sky region is calculated from an average value of luminance signals in the object region of interest, and that of the background region is calculated from a weighted average value using weights according to coordinates.

In step S604, the exposure amount calculation unit 105 calculates luminance level differences between the object regions using the representative luminance values of the respective object regions calculated in step S603.

Calculations of luminance level differences between the object regions will be described below with reference to FIG. 9B.

FIG. 9B exemplifies target exposure amounts of the respective object regions with reference to an exposure amount of an input image. A target exposure amount indicates an exposure amount having a level difference over or under the exposure amount of the input image, so as to set a representative luminance value of an object region to be calculated as a target luminance value.

"Over exposure amount" is to set an exposure amount larger than that of the input image, and "under exposure amount" is to set an exposure amount smaller than that of the input image. Note that a target luminance value is a value which is determined in advance for each object region.

Let HUMAN_Y, BACK_Y, and SKY_Y be representative luminance values of the respective object regions, and HUMAN_ref_Y, BACK_ref_Y, and SKY_ref_Y be target luminance values of the respective object regions. Target exposure amounts ΔBV_HUMAN_ref, ΔBV_BACK_ref, and ΔBV_SKY_ref are respectively calculated by:

$$\Delta BV\_HUMAN\_ref = LOG_2\left(\frac{HUMAN\_ref\_Y}{HUMAN\_Y}\right) \quad (1)$$

$$\Delta BV\_BACK\_ref = LOG_2\left(\frac{BACK\_ref\_Y}{BACK\_Y}\right)$$

$$\Delta BV\_SKY\_ref = LOG_2\left(\frac{SKY\_ref\_Y}{SKY\_Y}\right)$$

Luminance level differences between object regions are calculated from the target exposure amounts of the respective object regions calculated using equations (1). A luminance level difference ΔHB between the human face region and background region, a luminance level difference ΔBS between the background region and sky region, and a luminance level difference ΔHS between the human face region and sky region are respectively calculated by:

$$\Delta HB = ABS(\Delta BV\_HUMAN\_ref - \Delta BV\_BACK\_ref)$$

$$\Delta BS = ABS(\Delta BV\_BACK\_ref - \Delta BV\_SKY\_ref)$$

$$\Delta HS = ABS(\Delta BV\_HUMAN\_ref - \Delta BV\_SKY\_ref) \quad (2)$$

The luminance level differences ΔHB, ΔBS, and ΔHS between the object regions calculated using equations (2) are used in processing for determining an exposure amount in step S606.

Referring back to FIG. 6, in step S605, the exposure amount calculation unit 105 calculates an output luminance vale of a main object using the input image and the representative luminance values of the respective object regions calculated in step S603. The output luminance value of the main object is different from the aforementioned target luminance value, and represents a luminance value of a main object region to be finally output in a shot image. In this embodiment, in case of a scene including a person, since the person is considered as a main object, an output luminance value of the person face region is calculated. This embodiment uses a known method of determining a final luminance value of the person face region by checking the relationship between the luminance value of the person face region alone and that of the overall image (for example, Japanese Patent No. 4789776). Note that the present invention is not limited to this method, and a method of determining a luminance value of the person object region with reference to an object located at an intermediate luminance level using luminance level differences between the object regions may be used. Also, the target luminance value of the person face region may be used intact as the output luminance value. The calculated output luminance value of the face region of the person as the main object will be described as "HUMAN_OUT_Y" hereinafter.

In step S606, the exposure amount calculation unit 105 inputs the luminance level differences ΔHB, ΔBS, and ΔHS between the object regions calculated in step S604 and the output luminance value HUMAN_OUT_Y of the main object calculated in step S605, and determines an exposure amount for shooting an image optimal to perform tone processing.

The exposure amount determination method will be described below with reference to FIG. 9C.

FIG. 9C exemplifies output exposure amounts of the respective object regions with respect to the exposure amount of the input image signal. Each output exposure amount indicates an exposure amount having a level difference over or under the exposure amount of the input image, so as to realize a brightness level to be finally output of the corresponding object region.

Letting ΔBV_HUMAN, ΔBV_BACK, and ΔBV_SKY respectively be output exposure amounts of the person face region, background region, and sky region, the output exposure amounts of the respective object regions are calculated by:

$$\Delta BV\_HUMAN = LOG_2\left(\frac{HUMAN\_OUT\_Y}{HUMAN\_Y}\right) \quad (3)$$

$$\Delta BV\_BACK = \Delta BV\_HUMAN - \frac{\Delta HB}{2}$$

$$\Delta BV\_SKY = \Delta BV\_HUMAN - \frac{\Delta HS}{2}$$

As described by equations (3), the exposure amount of the object region other than the main object is determined to maintain a level difference by reducing the luminance level difference between the object regions calculated in step S604 to ½ with reference to the exposure amount of the main object determined based on the output luminance value calculated in step S605.

Of the output exposure amounts of the object regions, the smallest output exposure amount is determined as an exposure amount for shooting an image optimal to perform tone processing. More specifically, of the object regions, ΔBV_SKY of the sky region as the smallest output exposure amount is determined as an exposure amount at the time of shooting. In this embodiment, an exposure amount at the time of shooting is determined by the aforementioned method. In addition to this method, an exposure amount at the time of shooting may be determined by setting a reduction upper limit of an exposure amount (for example, an exposure amount can only be reduced to a predetermined value with respect to the output exposure amount of the main object).

As described above, the exposure amount calculation unit 105 obtains the input image, and determines an optimal exposure amount.

When an exposure amount is not calculated by a method other than the aforementioned method, tone processing cannot be performed using an optimal exposure amount. For example, when an exposure amount is large beyond necessity, an image of a wide dynamic range cannot be realized. Conversely, when an exposure amount is small beyond necessity, a digital gain is applied in the subsequent tone processing beyond necessity, image quality may deteriorate due to the influence of noise. By contrast, when an exposure amount is calculated as in this embodiment, an input image optimal to the subsequent tone processing can be obtained.

<Tone Processing>

The tone processing by the image processing unit 104 will be described below with reference to FIGS. 2 and 7.

The image processing unit 104 performs tone processing by inputting an image signal shot using an exposure amount determined by the exposure amount calculation unit 105.

Note that the tone processing of this embodiment applies, to the entire image, tone characteristics which reduce luminance level differences between the object regions. Also, by setting the maximum priority of the main object region, tone are assigned to the object regions other than the main object according to a scene in a balanced manner, thus generating an output image having contrast and brightness levels as a person observes.

Figure 7:
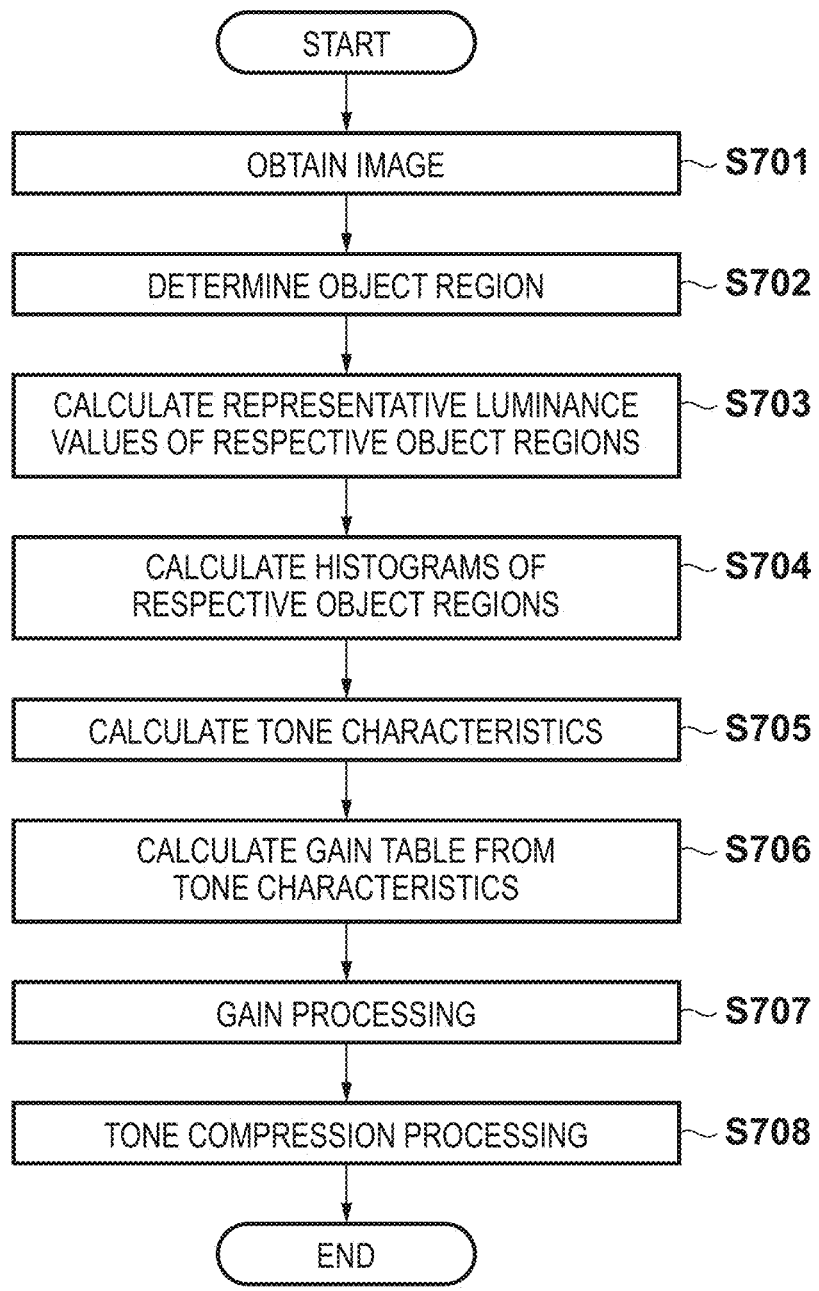
FIG. 7 is a flowchart showing tone processing by the image processing unit.

FIG. 2 partially shows the configuration of the image processing unit 104, and FIG. 7 shows the tone processing. Note that the processing shown in FIG. 7 is implemented when the system control unit 107 expands a program stored in a nonvolatile memory onto a work area of a volatile memory and controls the image processing unit.

In step S701, the image processing unit 104 obtains an image signal shot by the image capturing unit 102.

In step S702, the image processing unit 104 determines object regions from the image signal obtained in step S701. This object region determination processing is the same as the processing in step S602 described above.

In step S703, the image processing unit 104 calculates representative luminance values for respective object regions determined in step S702 to have the image signal obtained in step S701 as input information. The calculation method of the representative luminance values of the object regions is the same as that in step S603 described above.

In step S704, the image processing unit 104 calculates histograms for the respective object regions determined in step S702 to have the image signal obtained in step S701 as input information. In this embodiment, histograms of luminance signals are calculated. Note that histogram calculation target object regions are the person face region, background region, and sky region as in calculations of the representative luminance values.

Figure 17A:
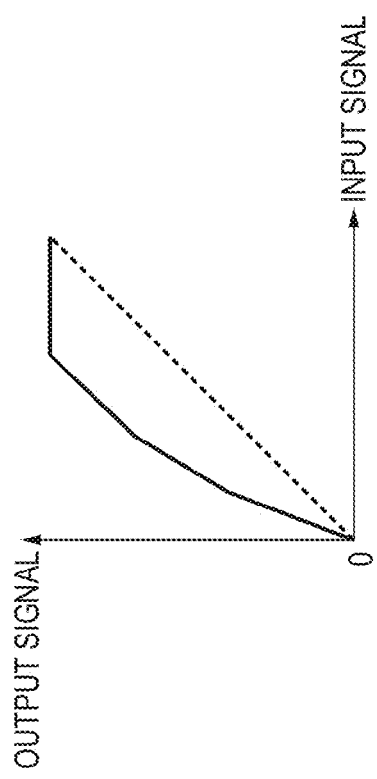
FIGS. 17A and 17B are graphs for explaining conversion from tone characteristics into a gain table.

In step S705, the image processing unit 104 inputs the representative luminance values for the respective object regions calculated in step S703 and the histograms for the respective object regions calculated in step S704, and calculates tone characteristics of the shot image. The tone characteristic calculation method will be described later. Note that the tone characteristics to be calculated in step S705 are input/output characteristics which represent an output signal according to an input signal, so that the abscissa plots the input signal, and the ordinate plots the output signal, as shown in FIG. 17A. For example, when tone characteristics are not changed, a graph indicated by the dotted line is used, and input and output signals assume an equal value. Note that in this embodiment, the input and output signals in FIG. 17A represent luminance signals.

Figure 17B:
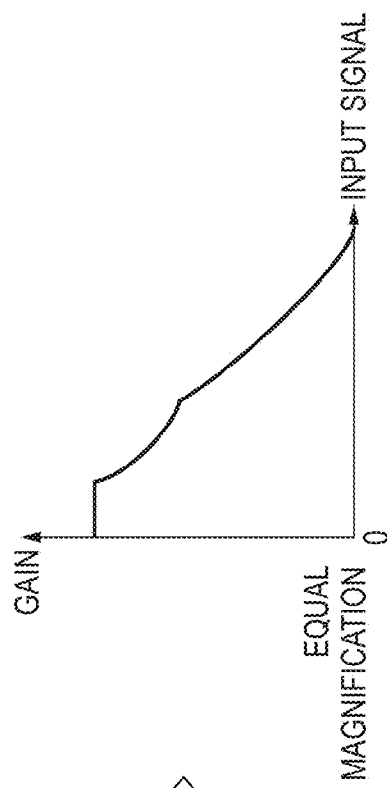

In step S706, the image processing unit 104 converts the tone characteristics calculated in step S705 into a gain table which indicates a gain according to an input signal, so that the abscissa plots the input signal and the ordinate plots the gain, as shown in FIG. 17B (gain table conversion processing). In this embodiment, the input signal shown in FIG. 17B represents a luminance signal. Letting x be an input signal and y be an output signal according to the input signal based on the tone characteristics, a gain Gain is calculated by:

$$\text{Gain} = \frac{y}{x} \quad (4)$$

In step S707, the image processing unit 104 performs processing for applying a gain to a shot image with reference to the gain table obtained in step S706. At this time, the image processing unit 104 refers to the same gain table for the plurality of object regions.

Figure 5:
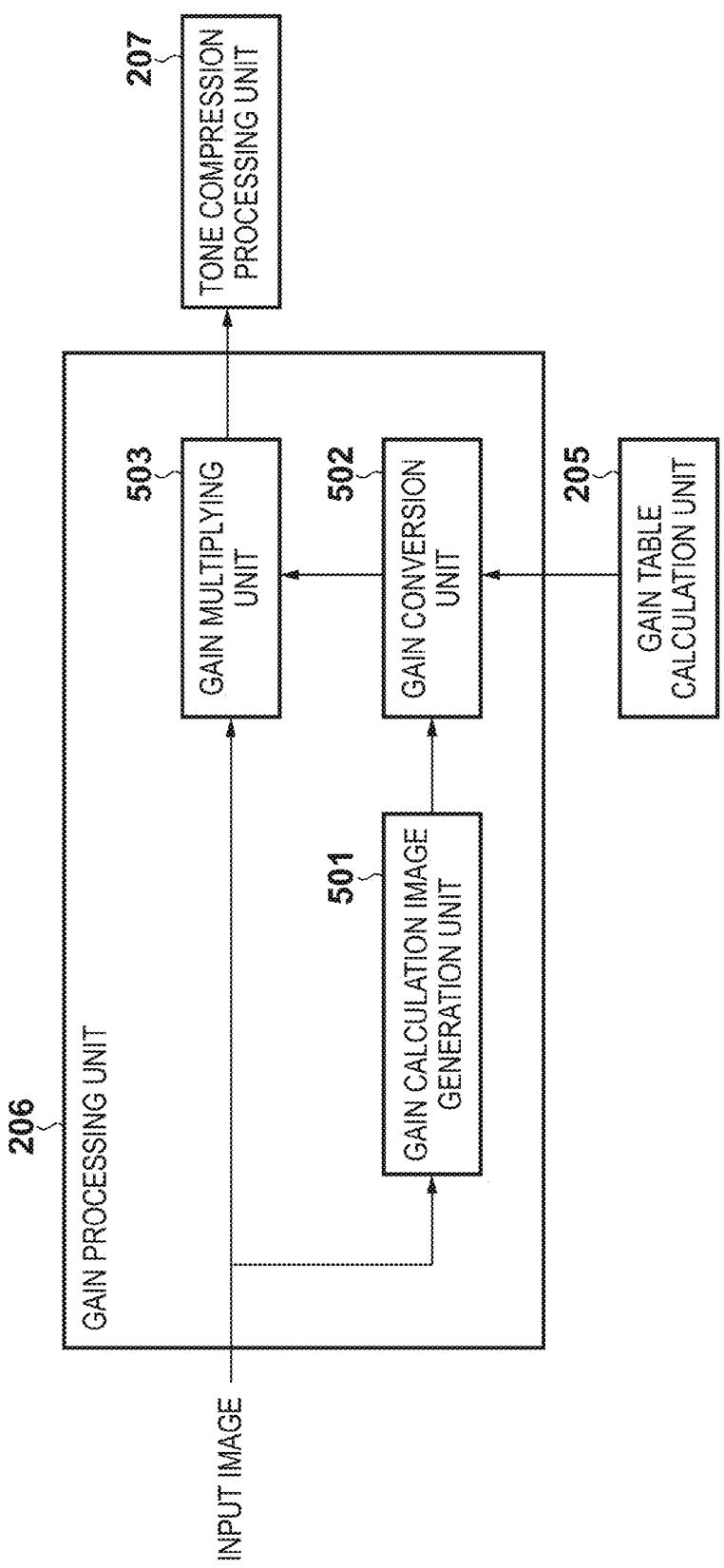
FIG. 5 is a block diagram showing the configuration of a gain processing unit.

The gain processing by a gain processing unit 206 will be described below with reference to FIG. 5.

When a pixel position of an input image is indicated by (x, y) to have a pixel (0, 0) located at an upper left position, letting Gain(x, y) be a gain output based on an input signal Yin(x, y), the gain Gain(x, y) can be expressed using a GainTbl function as the gain table obtained in step S706 by:

$$Gain(x,y) = GainTbl(Yin(x,y)) \quad (5)$$

Gain(x, y) is a gain corresponding to a pixel located at (x, y) of the input image.

Yin as an input signal for calculating a gain is generated by a gain calculation image generation unit 501 using the shot input image. As a gain calculation image generation method, the input image is converted into luminance image data, and undergoes averaging processing so as to enhance a contrast. By calculating a gain to have the luminance image data as an input, an effect in which the contrast can be enhanced more is obtained.

A gain conversion unit 502 performs gain signal conversion processing as described by equation (5) using the Yin signal generated by the gain calculation image generation unit 501.

A gain multiplying unit 503 performs processing for multiplying the input image signal by the gain calculated by the gain conversion unit 502. In this embodiment, processing for multiplying R, G, and B image signals obtained after demosaicing processing of the shot input image by the gain is performed. Let Rin(x, y), Gin(x, y), and Bin(x, y) be R, G, and B signals of the input image located at (x, y) before gain multiplication. In this case, R, G, and B signals Rout(x, y), Gout(x, y), and Bout(x, y) after gain multiplication can be calculated, using the GainTbl function given by equation (5), by:

$$Rout(x,y) = Rin(x,y) \times GainTbl(Yin(x,y))$$

$$Gout(x,y) = Gin(x,y) \times GainTbl(Yin(x,y))$$

$$Bout(x,y) = Bin(x,y) \times GainTbl(Yin(x,y)) \quad (6)$$

As described in equations (6), the R, G, and B signals are multiplied by the same gain at the pixel position (x, y).

Note that the gain processing is applied to the R, G, and B signals in this embodiment. Alternatively, the aforementioned gain processing may be applied to Y, U, and V signals.

Figure 18:
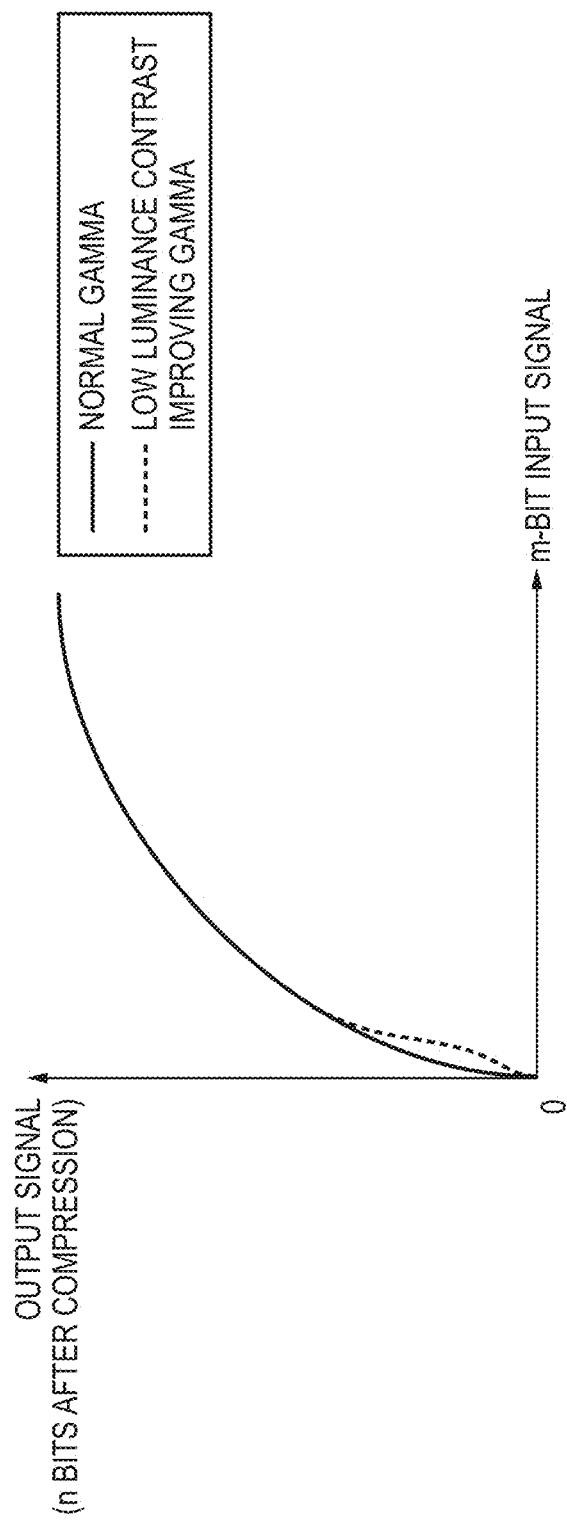
FIG. 18 is a graph for explaining tone compression characteristics based on γ characteristics.

Referring back to FIG. 7, in step S708, the image processing unit 104 performs tone compression processing using γ characteristics to adjust R, G, and B m-bit signals, which have undergone the gain processing in step S707, to characteristics of the display unit 109, thus outputting n-bit signals (m n) bits. In this embodiment, as the γ characteristics, two types of characteristics indicated by the solid curve and dotted curve in FIG. 18 are used. The γ characteristics indicated by the dotted curve are those which enhance the contrast of a low-luminance part as a measure against the low-contrast person face region caused by the influence of flare or the like at the time of backlight. The γ characteristics indicated by the dotted curve are used for a person scene at the time of backlight, and the γ characteristics indicated by the solid curve are used in scene other than the person scene at the time of backlight.

In the tone processing shown in FIG. 7, respective units of the image processing unit 104 shown in FIG. 2 perform the processes of respective steps. That is, an object region detection unit 201 performs the process of step S702, a regional histogram calculation unit 202 performs the process of step S704, and the regional luminance value calculation unit 203 performs the process of step S703. Also, a tone characteristic calculation unit 204 performs the process of step S705, a gain table calculation unit 205 performs the process of step S706, the gain processing unit 206 performs the process of step S707, and a tone compression processing unit 207 performs the process of step S708.

<Tone Characteristic Calculation Processing>

The tone characteristic calculation processing by the tone characteristic calculation unit 204 will be described below with reference to FIGS. 4 and 8.

The tone characteristic calculation unit 204 calculates tone characteristics of a shot image using the representative luminance values calculated for the respective object region and the luminance histograms calculated for the respective object regions as input information.

Figure 4:
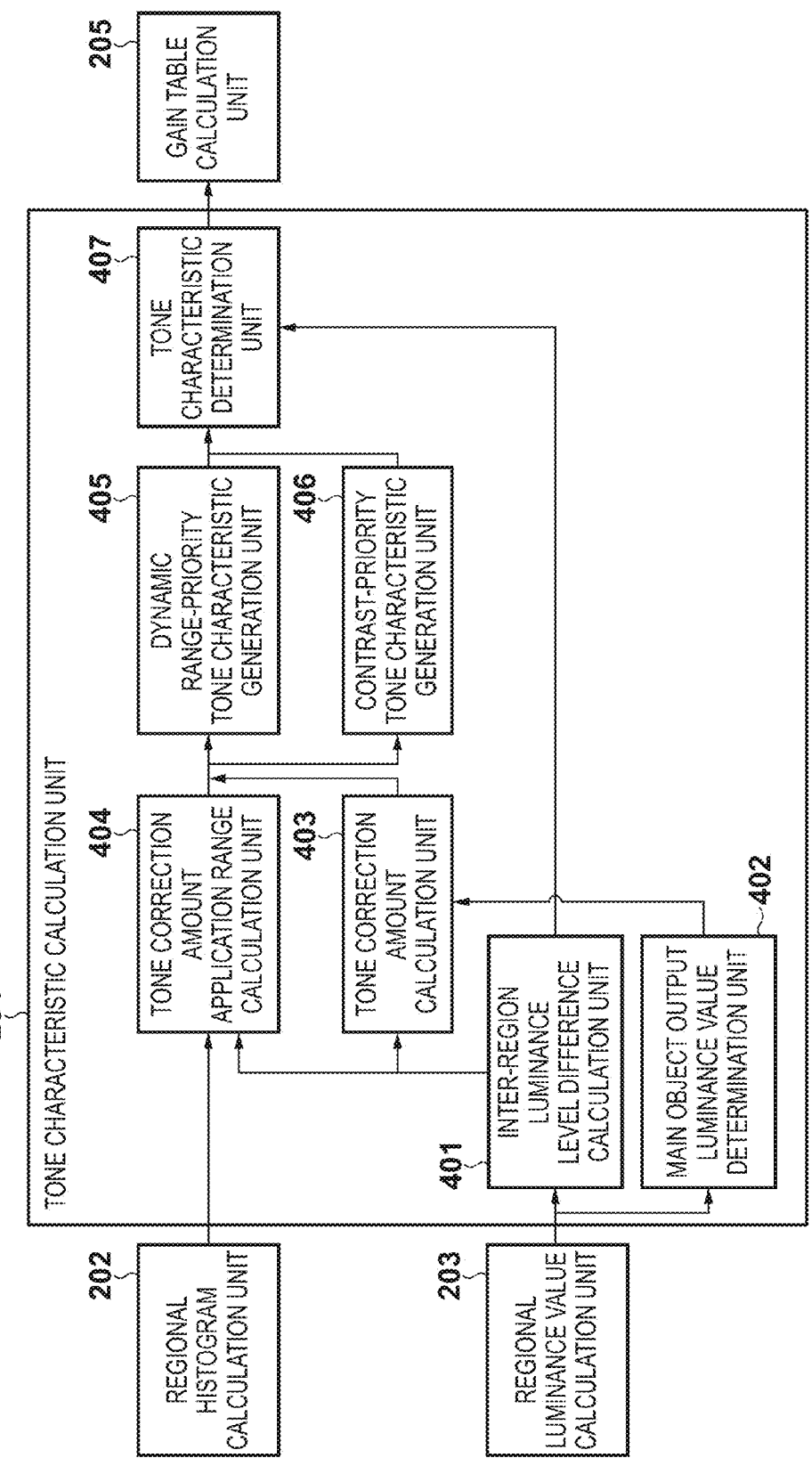
FIG. 4 is a block diagram showing the configuration of tone characteristic calculation unit.
Figure 8:
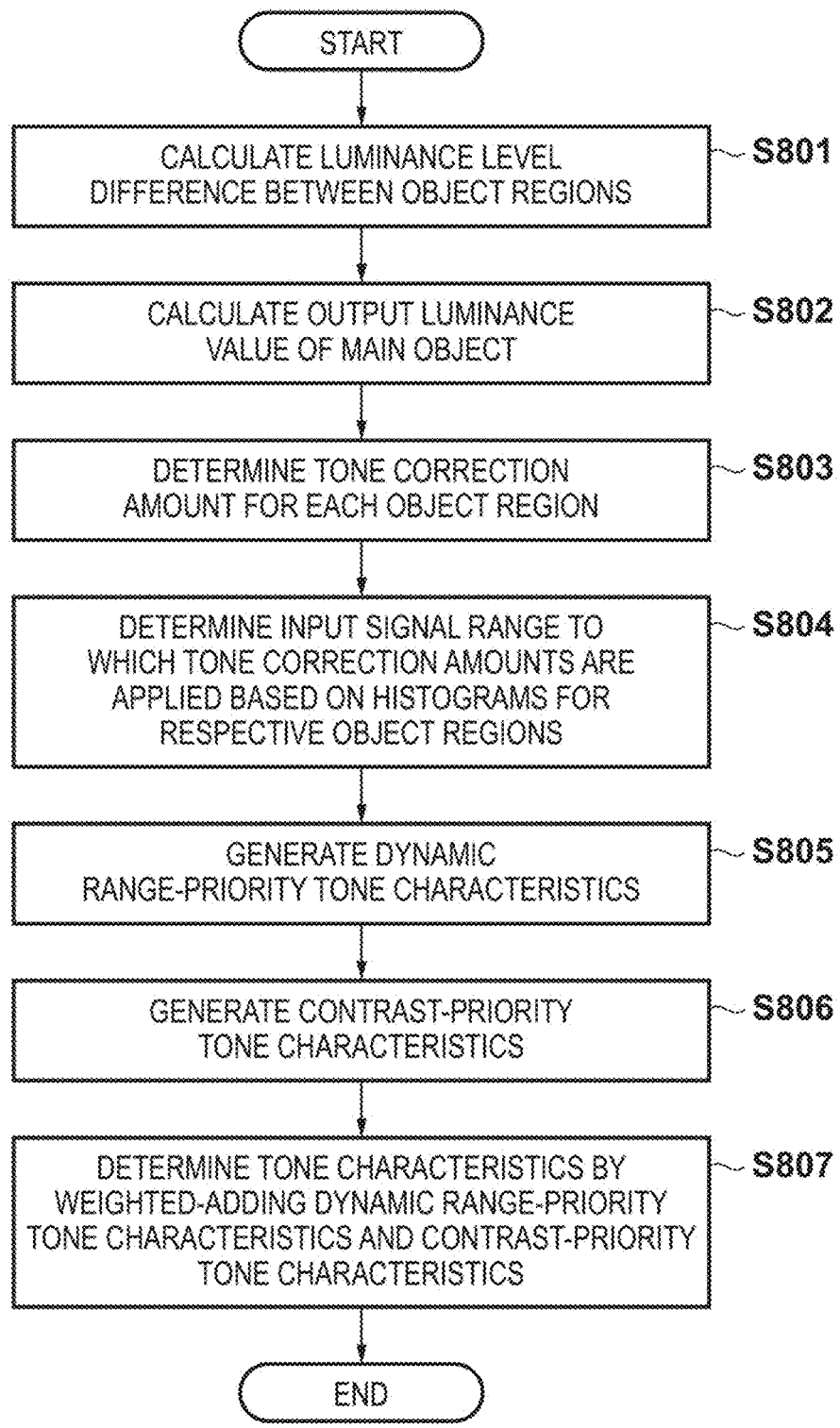
FIG. 8 is a flowchart showing processing by the tone characteristic calculation unit.

FIG. 4 shows the configuration of the tone characteristic calculation unit 204, and FIG. 8 shows the tone characteristic calculation processing. Note that the processing shown in FIG. 8 is implemented when the system control unit 107 expands a program stored in a nonvolatile memory onto a work area of a volatile memory and controls the aforementioned units.

In step S801, the tone characteristic calculation unit 204 calculates luminance level differences between the object regions using the representative luminance values calculated for the respective object regions. As for the luminance level difference calculation method, an exposure amount can be replaced by a gain amount in the process of step S604, as shown in FIG. 10A.

In step S802, the tone characteristic calculation unit 204 calculates an output luminance value of the main object. The output luminance value of the main object is a luminance value to be finally output of the main object region as in step S605. In this embodiment, the person face region is set as the main object region as in the above description, and the calculation method is the same as that in the process of step S605.

In step S803, the tone characteristic calculation unit 204 calculates tone correction amounts of the respective object regions using the luminance level differences between the object regions calculated in step S801 and the output luminance value of the main object calculated in step S802 as input information. Note that the tone correction amount indicates a uniform gain amount in this embodiment, and a uniform gain amount to be applied to each target object region is calculated.

As for the tone correction amount calculation method for each object region, an exposure amount can be replaced by a tone correction amount in step S606, as shown in FIG. 10B.

In the calculation method of the tone correction amounts of the respective object regions, letting GAIN_HUMAN, GAIN_BACK, and GAIN_SKY be gain amounts of the person face region, background region, and sky region, they are calculated by:

$$\text{GAIN\_HUMAN} = \text{LOG}_2\left(\frac{\text{HUMAN\_OUT\_Y}}{\text{HUMAN\_Y}}\right) \quad (7)$$

$$\text{GAIN\_BACK} = \text{GAIN\_HUMAN} - \frac{\Delta HB}{2}$$

$$\text{GAIN\_SKY} = \text{GAIN\_HUMAN} - \frac{\Delta HS}{2}$$

where HUMAN_Y is the representative luminance value of the person face region, HUMAN_OUT_Y is the output luminance value of the person face region as the main object region, ΔHB is a gain amount corresponding to the luminance level difference between the person face region and background region, and ΔHS is a gain amount corresponding to the luminance level difference between the person face region and sky region.

In this embodiment, since a gain amount less than 0 level is not used, after GAIN_HUMAN, GAIN_BACK, and GAIN_SKY are calculated using equations (7), if any of GAIN_HUMAN, GAIN_BACK, and GAIN_SKY assumes a negative value, it is clipped to zero.

Figure 11:
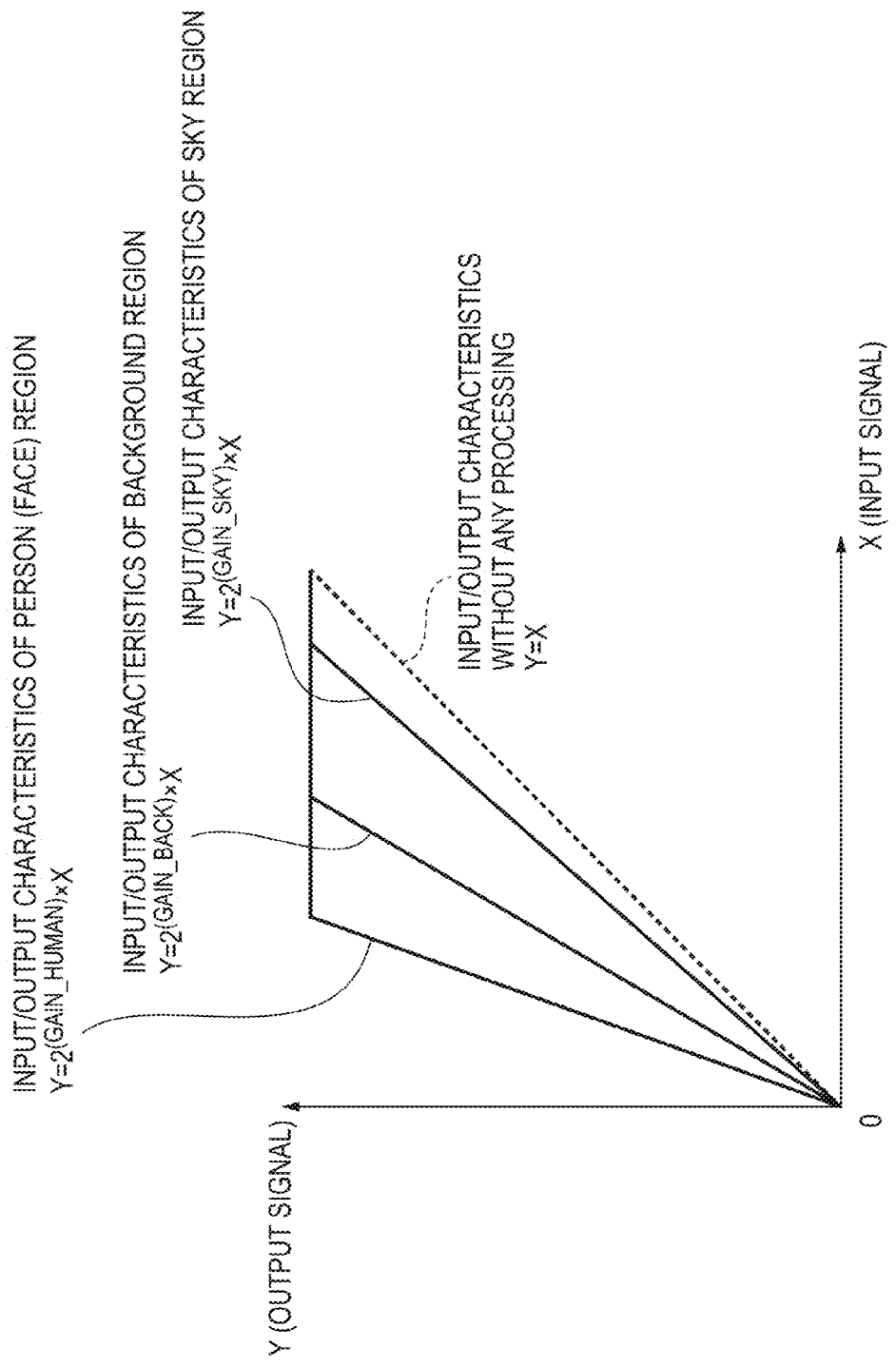
FIG. 11 is a graph for explaining input/output characteristics to be realized in respective object regions.

The tone correction amounts for the respective object regions are expressed by input/output characteristics, as shown in FIG. 11.

Letting X be an input signal, and Y be an output signal, input/output characteristics to be realized in the respective object regions are obtained by:

Input/output characteristics of person face region:
$$Y = 2^{(\text{GAIN\_HUMAN})} \times X$$

Input/output characteristics of background region:
$$Y = 2^{(\text{GAIN\_BACK})} \times X$$

Input/output characteristics of sky region:
$$Y = 2^{(\text{GAIN\_SKY})} \times X \quad (8)$$

The input/output characteristics of the respective object regions are tone characteristics to be applied to the respective object regions. A gradient of the input/output characteristics of each object region indicates a contrast level to be realized in that object region, and an output signal indicates a brightness level to be realized in that object region.

Referring back to FIG. 8, in step S804 and subsequent steps, processing for generating tone characteristics to be uniformly applied to a frame with reference to the input/output characteristics for the respective object regions will be described below.

In step S804, the tone characteristic calculation unit 204 determines input signal ranges to which the tone correction amounts for the respective object regions calculated in step S803 are to be applied using the luminance histograms for the respective object regions.

The input signal range will be described below with reference to FIG. 12.

Three input/output characteristics shown in FIG. 12 are those to be realized in the respective object regions, as described by equations (8). "HUMAN_POINT", "BACK_POINT", and "SKY_POINT" on the abscissa of the input/output characteristics are used as indices upon determination of the input signal ranges to which the input/output characteristics of the respective object region are applied. An input signal range from 0 to HUMAN_POINT is indicated by (1), an input signal range from 0 to BACK_POINT is indicated by (2), and an input signal range from SKY_POINT to a maximum value which can be expressed by an input signal is indicated by (3). (1) is an input signal range to which the input/output characteristics of the person face region are to be applied, (2) is an input signal range to which the input/output characteristics of the background region are to be applied, and (3) is an input signal range to which the input/output characteristics of the sky region are to be applied.

Figure 13B:
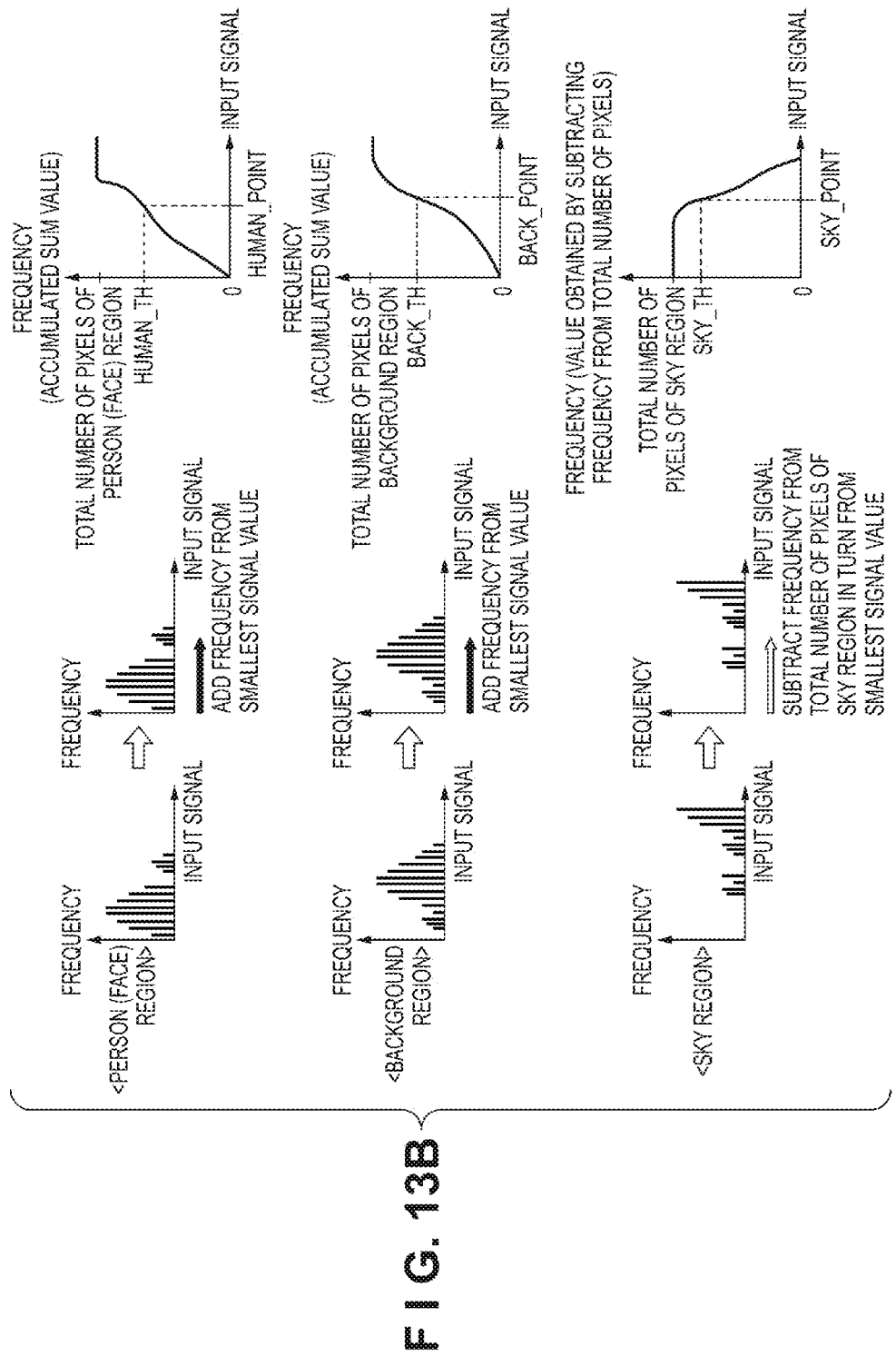

A calculation method of HUMAN_POINT, BACK_POINT, and SKY_POINT will be described below with reference to FIGS. 13A and 13B. HUMAN_POINT, BACK_POINT, and SKY_POINT are calculated using the luminance histograms calculated for the respective object regions, as shown in FIG. 13A. HUMAN_POINT is calculated using the luminance histogram of the person face region, BACK_POINT is calculated using the luminance histogram of the background region, and SKY_POINT is calculated using the luminance histogram of the sky region.

FIG. 13B exemplifies the calculation method of HUMAN_POINT, BACK_POINT, and SKY_POINT using the luminance histograms for the respective object regions.

The HUMAN_POINT calculation method will be described first. In this embodiment, frequencies are added to the luminance histogram of the person face region from a smallest signal value to gradually larger signal values. An input signal value to which the frequency is lastly added when a sum exceeds a predetermined threshold is determined as HUMAN_POINT.

Note that letting HUMAN_TH be a threshold, it can be calculated by:

$$\text{HUMAN\_}TH = \text{HUMAN\_AREASUM} \times P\_\text{HUMAN}$$
$$(0.0 < P\_\text{HUMAN} \le 1.0) \quad (9)$$

where HUMAN_AREASUM is the total number of pixels determined as the person face region, and P_HUMAN is an adjustment parameter. As described by equation (9), HUMAN_POINT is determined by checking whether or not the sum of frequencies reaches the predetermined threshold (%) with respect to the total number of pixels of the person face region.

Next, the BACK_POINT calculation method will be described below. In this embodiment, frequencies are added to the luminance histogram of the background region from the smallest signal value to gradually larger signal values. An input signal value to which the frequency is lastly added when a sum exceeds a predetermined threshold is determined as BACK_POINT. A threshold is set by the same method as HUMAN_TH.

Finally, the SKY_POINT calculation method will be described below.

In this embodiment, contrary to HUMAN_POINT and BACK_POINT, frequencies are subtracted from the luminance histogram of the sky region from a smallest signal value to gradually larger signal values based on the total number of pixels determined as the sky region. An input signal value from which the frequency is lastly subtracted when the difference falls below a predetermined threshold is determined as SKY_POINT. The threshold is set by the same method as HUMAN_TH.

As described above, different calculation methods are used for the sky region including a high-luminance object, the background region including middle- and low-luminance objects, and the person face region. This embodiment has explained the scene in which the sky region is brightest, and the person face region is darkest. However, when the background region includes a highest-luminance object, the same calculation method as SKY_POINT is used, and when the sky region includes a middle-luminance object, the same calculation method as BACK_POINT is used.

With the aforementioned processing, tone characteristics are generated using the tone correction amounts GAIN_HUMAN, GAIN_BACK, and GAIN_SKY for the respective object regions calculated in step S803, and HUMAN_POINT, BACK_POINT, and SKY_POINT used as indices of the application ranges of the tone correction amounts for the respective object regions calculated in step S804.

In this embodiment, a plurality of types (two types) of tone characteristics having different features are generated, and weighted addition of the two generated tone characteristics is performed, thereby calculating final tone characteristics.

Referring back to FIG. 8, in steps S805 and S806, the tone characteristic calculation unit 204 generates tone characteristics having different features.

The two types of tone characteristics to be generated in steps S805 and S806 will be described in detail below with reference to FIGS. 14A to 14C.

Figure 14A:
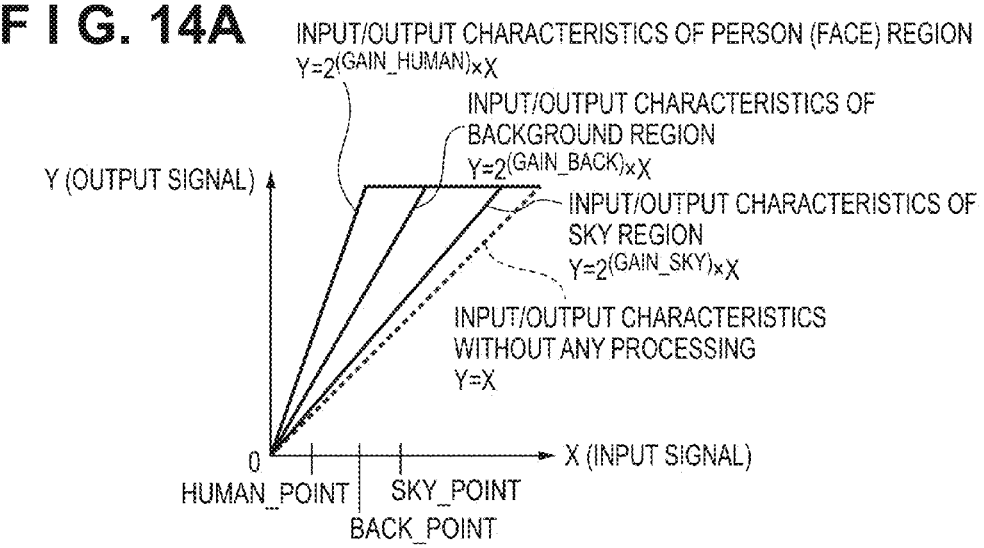
FIGS. 14A to 14C are graphs for explaining input/output characteristics to be realized in respective object regions, and dynamic range-priority and contrast-priority tone characteristics.

Three input/output characteristics shown in FIG. 14A are those to be realized in the respective object regions, as described by equations (8). HUMAN_POINT, BACK_POINT, and SKY_POINT on the abscissa of the input/output characteristics are indices used to determine input signal ranges to which the input/output characteristics of the respective object regions are applied.

Figure 14B:
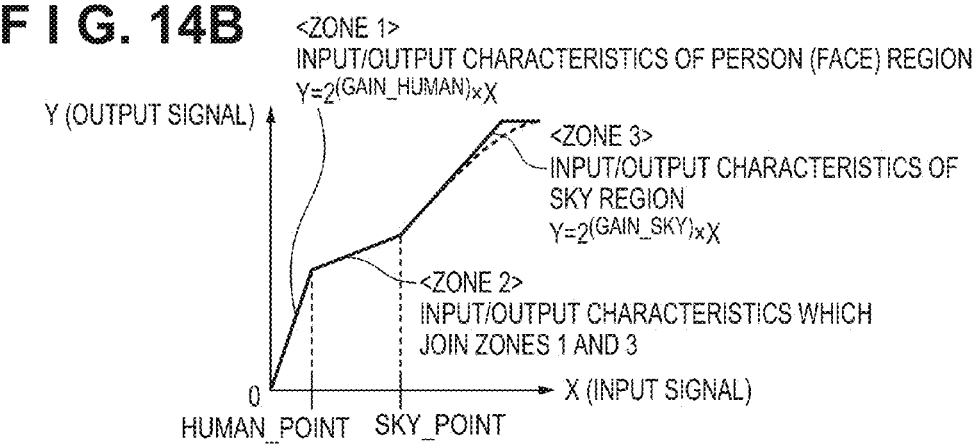
Figure 14C:
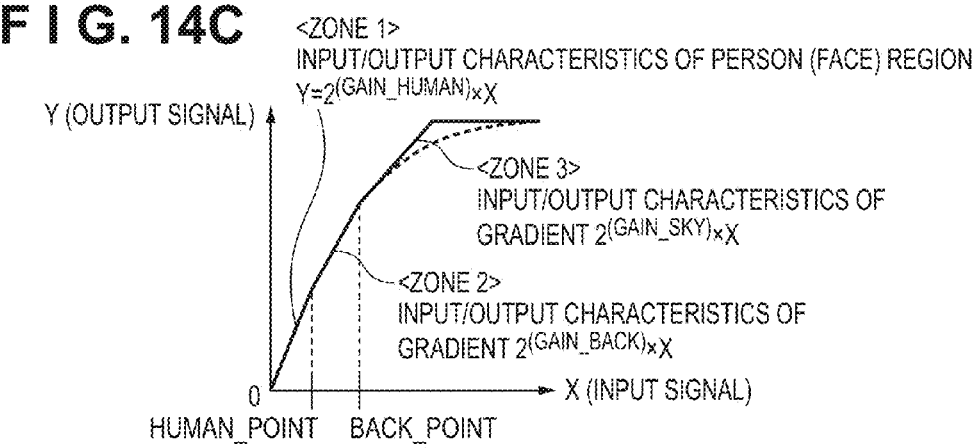

Based on FIG. 14A, this embodiment generates two types of tone characteristics, that is, tone characteristics called "dynamic range priority" shown in FIG. 14B and tone characteristics called "contrast priority" shown in FIG. 14C.

The dynamic range-priority tone characteristics shown in FIG. 14B will be described first.

The feature of the dynamic range-priority tone characteristics lies in that two input/output characteristics, that is, those for the person face region and those for the sky region shown in FIG. 14A are adopted. The tone characteristics have an advantage of realizing brightness and contrast levels of the person face region and sky region with respect to the characteristics shown in FIG. 14A.

A low luminance side zone from "0" of an input signal to HUMAN_POINT adopts the input/output characteristics of the person face region and, contrarily, a high luminance side zone from SKY_POINT to a maximum value that can be expressed by an input signal adopts the input/output characteristics of the sky region. A middle luminance zone from HUMAN_POINT to SKY_POINT adopts input/output characteristics which join those of the person face region on the low luminance side and those of the sky region on the high luminance side. Letting X be an input signal, and Y be an output signal, the dynamic range-priority tone characteristics are expressed by:

$$Y = 2^{(GAIN\_HUMAN)} \times X \qquad (10)$$

$$(0 \leq X < \text{HUMAN\_POINT})$$

$$Y = \frac{(2^{(GAIN\_SKY)} \times \text{SKY\_POINT} - 2^{(GAIN\_HUMAN)} \times \text{HUMAN\_POINT})}{(\text{SKY\_POINT} - \text{HUMAN\_POINT})} X +$$

$$2^{(GAIN\_HUMAN)} \times \text{HUMAN\_POINT}$$

$$Y = 2^{(GAIN\_SKY)} \times X$$

$$(\text{HUMAN\_POINT} \leq X < \text{SKY\_POINT})$$

$$(\text{SKY\_POINT} \leq X)$$

This embodiment adopts the input/output characteristics which saturate the high luminance side. Alternatively, as indicated by a dotted curve part of FIG. 14B, input/output characteristics which do not saturate the high luminance side as much as possible may be adopted. Note that in this embodiment, the input/output characteristics are generated using a polygonal line, but they may be generated using a curve which approximates the polygonal line.

The dynamic range-priority tone characteristics are generated in step S805.

Next, the contrast-priority tone characteristics shown in FIG. 14C will be described below.

The feature of the contrast-priority tone characteristics lies in that only gradients of the input/output characteristics of the background region and sky region are adopted, in addition to the input/output characteristics of the person face region described in FIG. 14A. The contrast-priority tone characteristics have an advantage in that the person face region realizes brightness and contrast levels, and the background region and sky region realize contrast levels with respect to the characteristics shown in FIG. 14A.

A zone from 0 of an input signal to HUMAN_POINT adopts the input/output characteristics of the person face region in the same manner as in the dynamic range-priority tone characteristics. A zone from HUMAN_POINT to BACK_POINT adopts characteristics which realize only a gradient of the input/output characteristics of the background region, and a zone from BACK_POINT to a maximum value that can be expressed by an input signal adopts characteristics which realize only a gradient of the input/output characteristics of the sky region. Letting X be an input signal, and Y be an output signal, the contrast-priority tone characteristics are expressed by:

$$Y=2^{(GAIN\_HUMAN)} \times X (0 \leq X < \text{HUMAN\_POINT})$$

$$Y=2^{(GAIN\_BACK)} \times X+2^{(GAIN\_HUMAN)} \times \text{HUMAN\_POINT}(\text{HUMAN\_POINT} \leq X < \text{BACK\_POINT})$$

$$Y=2^{(GAIN\_SKY)} \times X+2^{(GAIN\_BACK)} \times (\text{BACK\_POINT}-\text{HUMAN\_POINT})+2^{(GAIN\_HUMAN)} \times \text{HUMAN\_POINT (BACK\_POINT} \leq X) \qquad (11)$$

This embodiment adopts the input/output characteristics which saturate the high luminance side. Alternatively, as indicated by a dotted curve part of FIG. 14C, input/output characteristics which do not saturate the high luminance side as much as possible may be adopted. Note that in this embodiment, the input/output characteristics are generated using a polygonal line, but they may be generated using a curve which approximates the polygonal line.

The contrast-priority tone characteristics are generated in step S806.

The two types of tone characteristics, dynamic range-priority and contrast-priority tone characteristics, have been described. The two types of tone characteristics commonly realize the input/output characteristics of the person face region. This is because since the person face region is the main object region in a person scene in this embodiment, the tone characteristics of the person face region has to be determined to have the maximum priority.

Upon generation of the dynamic range-priority and contrast-priority tone characteristics, tone characteristics cannot often be generated from values of GAIN_HUMAN, GAIN_BACK, and GAIN_SKY and those of HUMAN_POINT, BACK_POINT, and SKY_POINT. A tone characteristic generation method in such case will be described below with reference to FIGS. 15A and 15B.

Figure 15A:
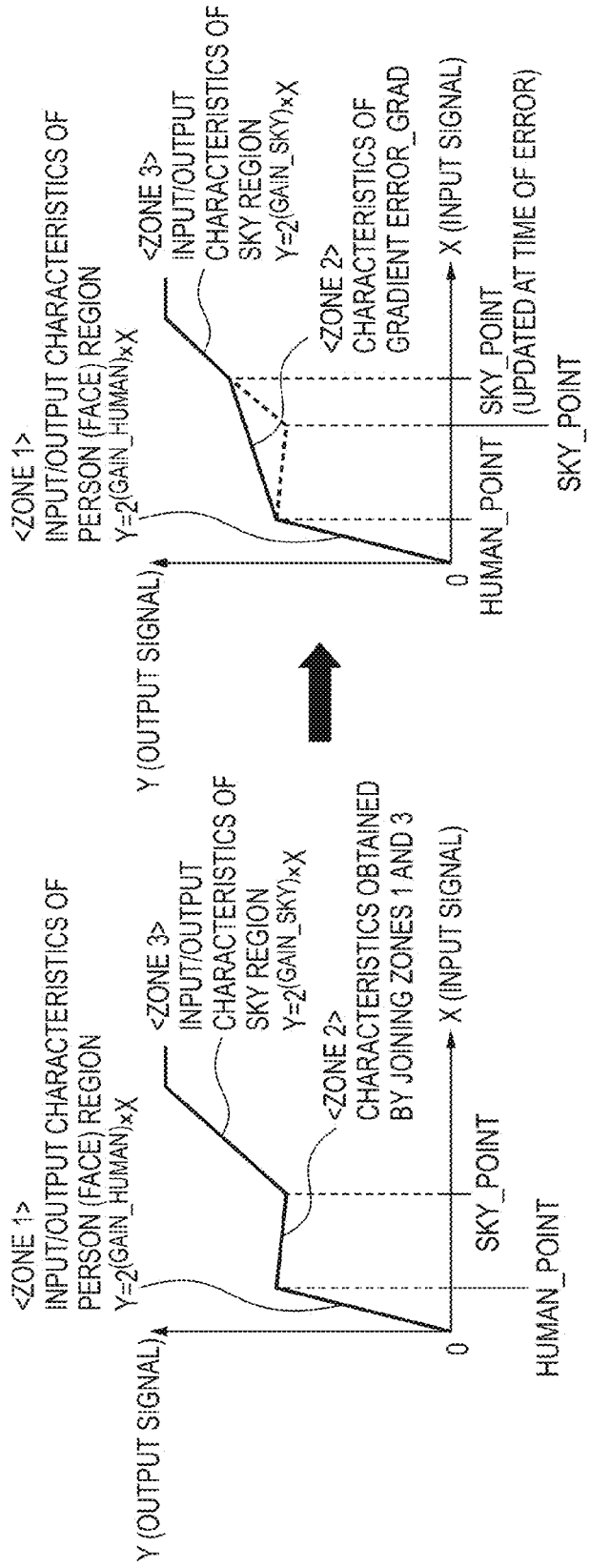
FIGS. 15A and 15B are graphs for explaining a tone characteristic generation method when tone characteristics cannot be correctly generated.

FIG. 15A exemplifies a case in which tone characteristics are inverted due to the influences of a narrow zone between SKY_POINT and HUMAN_POINT and a large gain difference between GAIN_HUMAN and GAIN_SKY. In this case, as shown in the left side of FIG. 15A, HUMAN_POINT, GAIN_HUMAN, and GAIN_SKY are left unchanged, ERROR_GRAD determined in advance as a gradient at the time of an error is given to a middle luminance zone, and SKY_POINT is moved, thus generating tone characteristics. When SKY_POINT assumes a value not more than HUMAN_POINT, tone characteristics in case of an error are similarly applied.

Figure 15B:
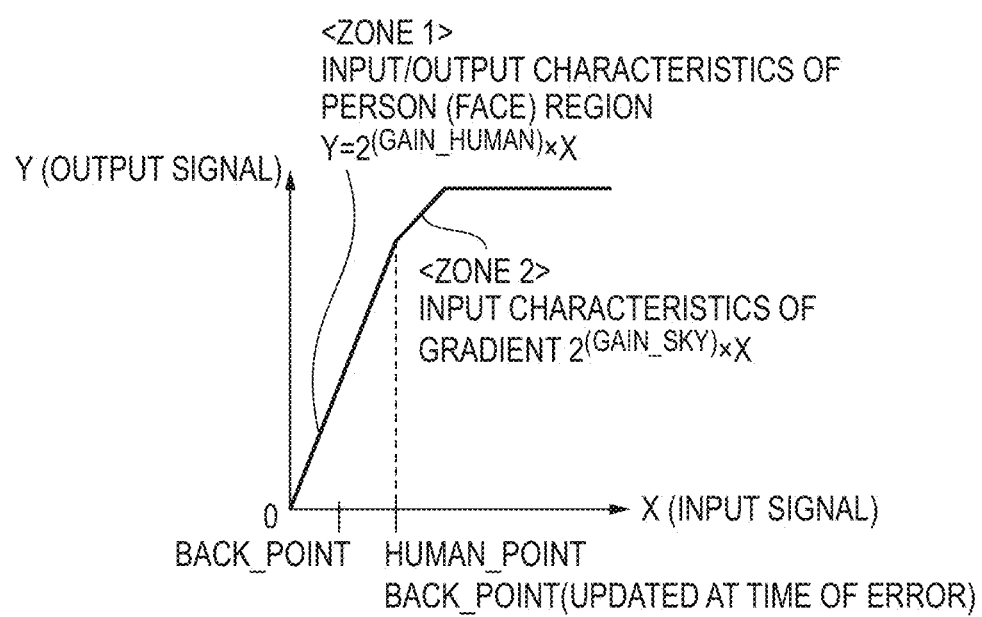

In the contrast-priority tone characteristics shown in FIG. 15B, even when BACK_POINT assumes a value not more than HUMAN_POINT, HUMAN_POINT and GAIN_HUMAN are left unchanged, and BACK_POINT is moved to match HUMAN_POINT.

With the above processing, the tone characteristics at the time of an error adopt input/output characteristics of the person face region up to a value of HUMAN_POINT, and adopt GAIN_SKY as a gradient of the input/output characteristics of the sky region after HUMAN_POINT.

As shown in FIGS. 15A and 15B, even when an error occurs, tone characteristics are generated without changing GAIN_HUMAN and HUMAN_POINT to which the input/output characteristics of the person face region as the main object.

The tone characteristic generation method at the time of an error has been described. The same generation method of two types of tone characteristics applies to a case in which only two object regions are set. For example, in case of a scene including only a person and sky as a high-luminance object, BACK_POINT and GAIN_BACK need only be replaced by SKY_POINT and GAIN_SKY in the two types of tone characteristics shown in FIGS. 14A to 14C.

With the aforementioned processes of steps S805 and S806, the tone characteristics according to two types of priorities, that is, dynamic range priority and contrast priority can be generated. By performing weighted addition of the generated two types of tone characteristics in step S807, tone characteristics of a shot image are determined.

The tone characteristic determination processing in step S807 will be described in detail below with reference to FIGS. 16A to 16C.

As a method of performing weighted addition of tone characteristics according to two types of priorities, that is, dynamic range priority and contrast priority, this embodiment uses the luminance level differences between the object regions calculated in step S801 (weighted-addition coefficient calculation processing). With reference to the background region including a middle-luminance object, the luminance level difference ΔHB between the person face region and background region and the luminance level difference ΔBS between the background region and sky region are used as weighted-addition coefficients of the two types of tone characteristics.

Letting X be an input signal of tone characteristics and Y be an output signal, assume that dynamic range-priority tone characteristics and contrast-priority tone characteristics are respectively expressed by a Drange function and Contrast function, as described by:

$$Y = \text{Drange}(X)$$

$$Y = \text{Contrast}(X) \tag{12}$$

Using equations (12), tone characteristics after weighted addition, that is, tone characteristics of a shot image are expressed by a MIX_OUT function, as described by:

$$Y = \text{MIX\_OUT}(X) \tag{13}$$
$$= \frac{(\Delta HB \times \text{Drange}(X) + \Delta BS \times \text{Contrast}(X))}{(\Delta HB + \Delta BS)}$$

As described by equation (13), the luminance level difference ΔHB between the person face region and background region and the luminance level difference ΔBS between the background region and sky region are respectively used as dynamic range priority and contrast priority weighted-addition coefficients.

Effects obtained when the luminance level difference ΔHB between the person face region and background region and the luminance level difference ΔBS between the background region and sky region are used in weighted addition will be described in detail below with reference to FIGS. 16A to 16C.

Figure 16A:
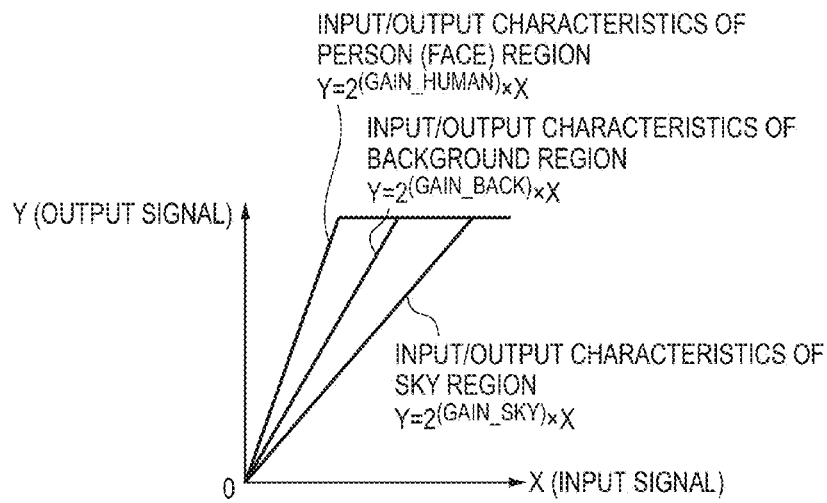
FIGS. 16A to 16C are graphs for explaining effects obtained when luminance level differences between object regions are used as weighted-addition coefficients of two different tone characteristics.

Three input/output characteristics shown in FIG. 16A are those to be realized in the respective object regions, as described by equations (8).

The three input/output characteristics shown in FIG. 16A are determined using the luminance level differences between the object regions, as described by equations (7). Since the luminance level differences between the object regions change according to a shot scene, the input/output characteristics to be realized in the respective object regions also change according to the scene.

Figure 16B:
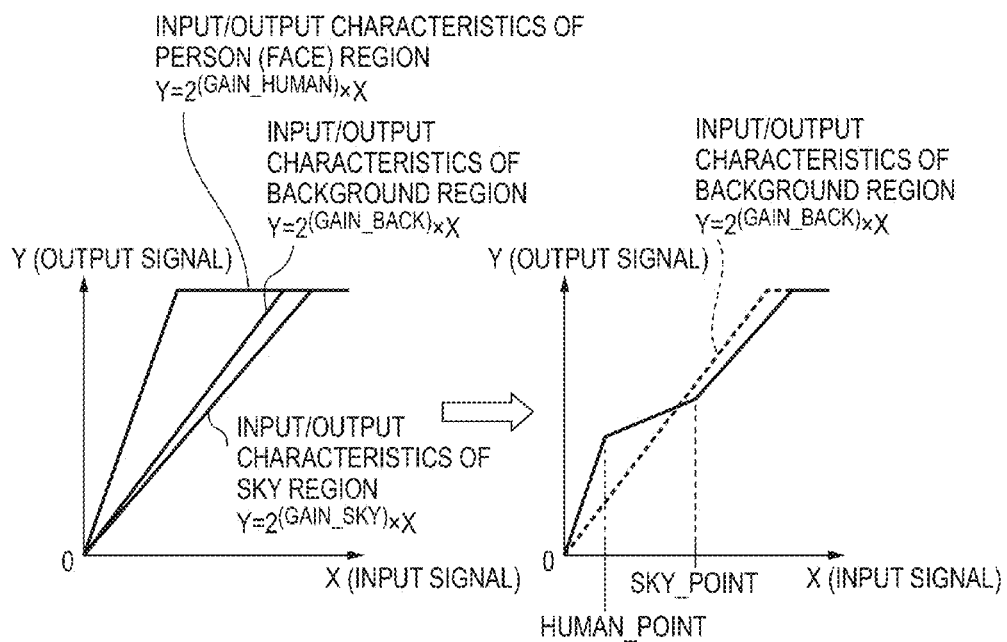

Input/output characteristics shown on the left side of FIG. 16B are those to be realized in the respective object regions in a scene in which the luminance level difference ΔBS between the background region and sky region is extremely smaller than the luminance level difference ΔHB between the person face region and background region. Since the gradients of the input/output characteristics to be realized in the respective object regions are determined according to equations (7), the input/output characteristics of the background region tend to approach those of the sky region.

In the aforementioned case, the dynamic range-priority tone characteristics shown on the right side of FIG. 16B are to be used in the tone processing to readily realize the input/output characteristics of the background region. This is because when the luminance level difference ΔBS is extremely small, many input signal components of the background region tend to be distributed around and after SKY_POINT, and the many input signal components of the background region fit to the dynamic range-priority tone characteristics after SKY_POINT.

Figure 16C:
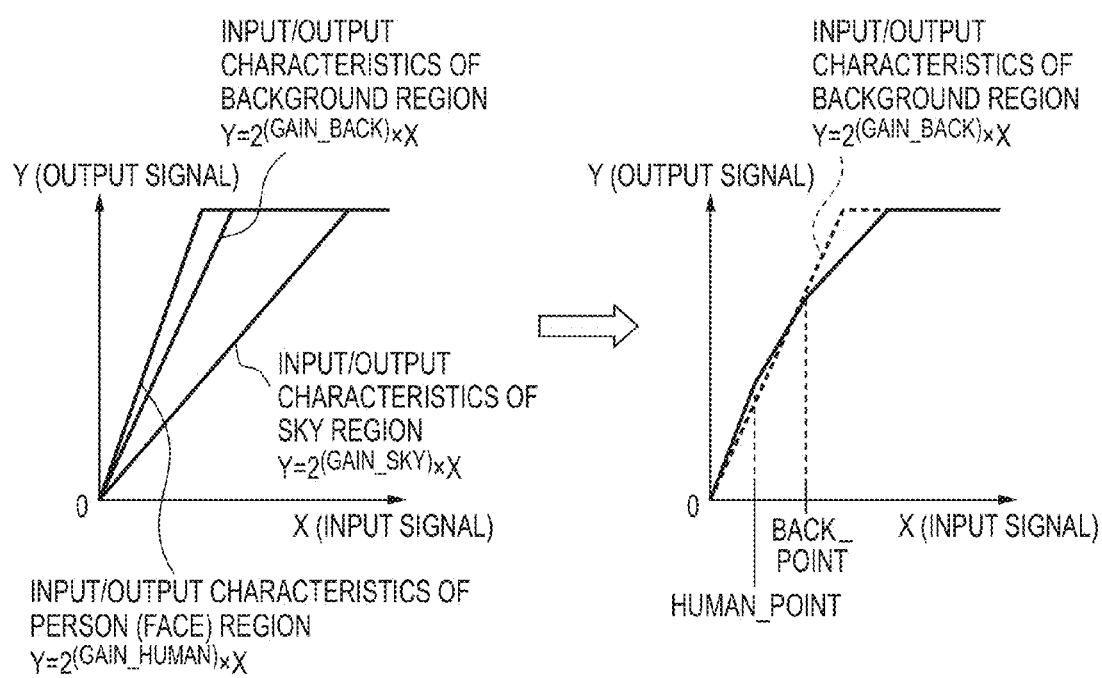

Contrary to FIG. 16B, input/output characteristics shown on the left side of FIG. 16C are those to be realized in the respective object regions in a scene in which the luminance level difference ΔBS between the background region and sky region is extremely larger than the luminance level difference ΔHB between the person face region and background region. Since the gradients of the input/output characteristics to be realized in the respective object regions are determined according to equations (7), the input/output characteristics of the background region tend to approach those of the person face region.

In the aforementioned case, the contrast-priority tone characteristics shown on the right side of FIG. 16C are to be used in the tone processing to readily realize the input/output characteristics of the background region. This is because when the luminance level difference ΔBS is extremely larger than the luminance level difference ΔHB, many input signal components of the background region tend to be distributed within a range from around HUMAN_POINT to BACK_POINT, and the input/output characteristics of the person face region and background region have close gradients. Thus, the input/output characteristics to be realized in the background region tend to approach the contrast-priority tone characteristics of BACK_POINT or lower.

Tone characteristics optimal to a shot image can be efficiently generated using the input/output characteristics to be realized in the three object regions by weighted addition using the luminance level difference ΔHB between the person face region and background region and the luminance level difference ΔBS between the background region and sky region, as given by equation (13).

In this embodiment, the tone characteristics of a shot image are generated using the luminance level differences between the object regions from equation (13). Alternatively, letting α and β be weighted-addition coefficients, the tone characteristics may be generated using another information, as given by:

$$Y = \text{MIX\_OUT}(X) \tag{14}$$
$$= \frac{(\alpha \times \text{Drange}(X) + \beta \times \text{Contrast}(X))}{(\alpha + \beta)}$$

Also, area ratios between the object regions, values according to the luminance level differences between the object regions, or a fixed value independent of a scene may be given.

For example, in a scene in which an area of the background region is smaller than the sky region, the brightness and contrast of the sky region are to approach those to be realized, thus improving the appearance of an image. Conversely, in a scene in which an area of the sky region is smaller than the background region, the contrast of the background region is to approach that to be realized, thus improving the appearance of an image. For these reasons, the tone characteristics can be generated by applying equation (14) while setting α to be the total number of pixels which occupy the sky region and β to be the total number of pixels which occupy the background region.

Also, in a scene including only two objects, weighted-addition coefficients are to be calculated according to a luminance level difference value between object regions, and weighted addition of two tone characteristics is to be performed. This is because, for example, in case of a scene including only a person and sky, that is, a scene originally having a small luminance level difference between object regions, the appearance of an image is better by prioritizing a high contrast over a wide dynamic range. Also, in a scene originally having a large luminance level difference between object regions, the appearance of an image is better by prioritizing a dynamic range over a contrast. Hence, the weighted-addition coefficients α and β of equation (14) are calculated by:

$$\text{If } TH1 \geq \Delta \qquad (15)$$
$$\alpha = 0.0,$$
$$\beta = 1.0$$
$$\text{If } TH1 < \Delta < TH2$$
$$\alpha = \frac{1.0}{(TH2 - TH1)} \times (\Delta - TH1),$$
$$\beta = 1.0 - \alpha$$
$$\text{If } TH2 \leq \Delta$$
$$\alpha = 1.0,$$
$$\beta = 0.0$$

where $\Delta$ is a luminance level difference between the two object regions. For example, in case of a scene including only a person and sky, the value of the luminance value difference $\Delta HS$ between the person face region and sky region is used as that of $\Delta$. Thresholds TH1 and TH2 are adjustment parameters.

As described above, the weighted-addition coefficients α and β of equations (15) may be calculated using various kinds of information in place of the method of this embodiment.

In the tone characteristic determination processing shown in FIG. 8, respective units of the tone characteristic calculation unit 204 shown in FIG. 4 perform the processes of respective steps. That is, an inter-region luminance level difference calculation unit 401 performs the process of step S801, a main object output luminance calculation unit 402 performs the process of step S802, a tone correction amount calculation unit 403 performs the process of step S803, a tone correction amount application range calculation unit 404 performs the process of step S804, a dynamic range-priority tone characteristic generation unit 405 performs the process of step S805, a contrast-priority tone characteristic generation unit 406 performs the process of step S806, and a tone characteristic determination unit 407 performs the process of step S807.

The aforementioned embodiment has exemplified the case in which the present invention is applied to the image capturing apparatus such as a digital video camera. However, the present invention is not limited to this, and is applicable to any other apparatuses as long as they perform tone processing using information of object regions.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-023825, filed Feb. 8, 2013 which is hereby incorporated by reference herein in its entirety.

What is claimed is:

1. An image processing apparatus comprising one or more processors that function as:
   a region discrimination unit configured to discriminate object regions included in an image;
   a first calculation unit configured to calculate representative luminance values of a plurality of object regions discriminated by the region discrimination unit;
   a second calculation unit configured to calculate luminance histograms of the plurality of object regions discriminated by the region discrimination unit;
   a determination unit configured to determine tone characteristics based on the representative luminance values of the plurality of object regions calculated by the first calculation unit and the luminance histograms of the plurality of object regions calculated by the second calculation unit; and
   an image processing unit configured to perform tone correction processing based on the tone characteristics determined by the determination unit, wherein the determination unit calculates a plurality of input/output characteristics based on the respective representative luminance values of the plurality of object regions, and calculates input value ranges respectively using the plurality of input/output characteristics based on the respective luminance histograms of the plurality of object regions, and determines the tone characteristics by combining the plurality of calculated input/output characteristics, wherein the determination unit calculates the input value ranges respectively using the plurality of input/output characteristics based on a luminance value obtained when values added to a luminance histogram of a first object luminance side reach a predetermined threshold, and determines the tone characteristics.

2. The apparatus according to claim 1, wherein the determination unit calculates first input/output characteristics based on a representative luminance value of a first object region included in the plurality of object regions, and determines an input value range using the first input/output characteristics based on a luminance histogram of the first object region.

3. The apparatus according to claim 1, wherein the first calculation unit calculates input/output characteristics used in an input value range, which is determined based on a luminance histogram of a first object region included in the plurality of object regions, based on a representative luminance value of the first object region, and calculates input/output characteristics used in an input value range, which is determined based on a luminance histogram of a second object region included in the plurality of object regions, based on a representative luminance value of the second object region and the representative luminance value of the first object region, wherein the first object region is a main object region, and the second object region is an object region which does not include the main object region.

4. The apparatus according to claim 3, wherein the first calculation unit calculates a first gain amount based on the representative luminance value of the first object region, and calculates the input/output characteristics used in the input value range, which is determined based on the luminance histogram of the first object region, based on the first gain amount.

5. The apparatus according to claim 4, wherein the first calculation unit calculates a second gain amount based on the representative luminance value of the second object region, and calculates the input/output characteristics used in the input value range, which is determined based on the luminance histogram of the second object region, based on the first gain amount and the second gain amount.

6. The apparatus according to claim 5, wherein the first calculation unit calculates the input/output characteristics used in the input value range, which is determined based on the luminance histogram of the second object region, based on a difference between the first gain amount and the second gain amount.

7. The apparatus according to claim 3, wherein the main object region is a person face region discriminated by the region discrimination unit.

8. The apparatus according to claim 4, wherein the first calculation unit calculates the first gain amount based on a difference between an output target luminance value of the first object region and the representative luminance value of the first object region.

9. The apparatus according to claim 5, wherein the first calculation unit calculates the second gain amount based on a difference between an output target luminance value of the second object region and the representative luminance value of the second object region.

10. The apparatus according to claim 1, wherein the determination unit calculates the input value ranges respectively using the plurality of input/output characteristics based on a luminance value obtained when values added to a luminance histogram of a second object region included in the plurality of object regions from a high luminance side to a low luminance side reach a predetermined threshold, and determines the tone characteristics, wherein a representative luminance value of the second object region is higher than a representative luminance value of the first object region.

11. The apparatus according to claim 1, wherein the determination unit calculates first tone characteristics and second tone characteristics based on the respective representative luminance values of the plurality of object regions and the respective luminance histograms of the plurality of object regions, and determines third tone characteristics by performing weighted arithmetic processing of the first tone characteristics and the second tone characteristics based on the respective representative luminance values of the plurality of object regions.

12. The apparatus according to claim 11, wherein the determination unit determines a ratio between the first tone characteristics and the second tone characteristics upon determination of the third tone characteristics based on a size of a first object region included in the plurality of object regions.

13. The apparatus according to claim 12, wherein the determination unit determines a ratio between the first tone characteristics and the second tone characteristics upon determination of the third tone characteristics based on a size of a second object region included in the plurality of object regions.

14. The apparatus according to claim 1, further comprising a conversion processing unit configured to convert the tone characteristics determined by the determination unit into a gain table, wherein the image processing unit performs the tone correction processing using the gain table.

15. The apparatus according to claim 14, wherein the image processing unit performs the tone correction processing using the same gain table for the plurality of object regions.

16. An image processing method comprising:
discriminating object regions included in an image;
calculating representative luminance values of a plurality of discriminated object regions;
calculating luminance histograms of the plurality of discriminated object regions;
determining tone characteristics based on the representative luminance values of the plurality of discriminated object regions and the luminance histograms of the plurality of discriminated object regions;
and performing tone correction processing based on the determined tone characteristics, wherein a plurality of input/output characteristics are calculated based on the respective representative luminance values of the plurality of discriminated object regions, and input value ranges respectively using the plurality of input/output characteristics are calculated based on the respective luminance histograms of the plurality of discriminated object regions, and the tone characteristics is determined by combining the plurality of calculated input/output characteristics, wherein the respective input value ranges are calculated using the plurality of input/output characteristics based on a luminance value obtained when values added to a luminance histogram of a first object region included in the plurality of object regions from a low luminance side to a high luminance side reach a predetermined threshold, and determines the tone characteristics.

17. A non-transitory computer-readable storage medium storing a program for causing a computer to execute an image processing method comprising:
discriminating object regions included in an image;
calculating representative luminance values of a plurality of discriminated object regions;
calculating luminance histograms of the plurality of discriminated object regions;
determining tone characteristics based on the respective representative luminance values of the plurality of discriminated object regions and the luminance histograms of the plurality of discriminated object regions; and
performing tone correction processing based on the determined tone characteristics, wherein a plurality of input/output characteristics are calculated based on the respective representative luminance values of the plurality of discriminated object regions, and input value ranges respectively using the plurality of input/output characteristics are calculated based on the respective luminance histograms of the plurality of discriminated object regions, and the tone characteristics is determined by combining the plurality of calculated input/output characteristics, wherein the respective input value ranges are calculated using the plurality of input/output characteristics based on a luminance value obtained when values added to a luminance histogram of a first object region included in the plurality of object regions from a low luminance side to a high luminance side reach a predetermined threshold, and determines the tone characteristics.

* * * * *